US010817613B2

(12) United States Patent
Akselrod et al.

(10) Patent No.: US 10,817,613 B2
(45) Date of Patent: Oct. 27, 2020

(54) ACCESS AND MANAGEMENT OF ENTITY-AUGMENTED CONTENT

(71) Applicant: Microsoft Corporation, Redmond, WA (US)

(72) Inventors: Gregory Akselrod, Seattle, WA (US); Donald Gordon Hardy, Seattle, WA (US); Pradeep Chilakamarri, Redmond, WA (US); Shikha Devesh Desai, Bellevue, WA (US); Bernhard S. J. Kohlmeier, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 151 days.

(21) Appl. No.: 14/319,654

(22) Filed: Jun. 30, 2014

(65) Prior Publication Data

US 2015/0046493 A1     Feb. 12, 2015

Related U.S. Application Data

(60) Provisional application No. 61/863,241, filed on Aug. 7, 2013.

(51) Int. Cl.
*G06Q 10/10* (2012.01)
*G06F 16/908* (2019.01)
(Continued)

(52) U.S. Cl.
CPC ........ *G06F 21/6218* (2013.01); *G06F 3/0481* (2013.01); *G06F 16/908* (2019.01);
(Continued)

(58) Field of Classification Search
CPC .. G06F 21/6218; G06F 3/0481; G06F 17/278; G06F 2221/21; G06F 2221/2117;
(Continued)

(56) References Cited

U.S. PATENT DOCUMENTS 5,953,720 A *  9/1999  Mithal .............. G06F 17/30067
6,088,707 A     7/2000  Bates et al.
(Continued)

FOREIGN PATENT DOCUMENTS

CN     101237465 A     8/2008
CN     101490676 A     7/2009
(Continued)

OTHER PUBLICATIONS

"Evernote", Retrieved on: Nov. 26, 2013, Available at: http://www.dsruption.com/evernote/a/5287d9337782650200000095.
(Continued)

*Primary Examiner* — Tony Mahmoudi
*Assistant Examiner* — Kamal K Dewan
(74) *Attorney, Agent, or Firm* — Talem IP Law, LLP

(57) ABSTRACT

Access and management of a user's content may be facilitated by, in response to receiving a request for content related to a specified entity from the repository associated with at least the user's account, identifying, in a content of a file in the repository, an entity container of at least one entity container associated with the specified entity; and communicating the entity container that is associated with the specific entity to a source of the request.

19 Claims, 17 Drawing Sheets

(51) Int. Cl.
*G06F 40/295* (2020.01)
*G06F 3/0481* (2013.01)
*G06F 21/62* (2013.01)
*G06F 16/955* (2019.01)

(52) U.S. Cl.
CPC ........ *G06F 16/9566* (2019.01); *G06F 40/295* (2020.01); *G06Q 10/10* (2013.01); *G06F 2221/21* (2013.01); *G06F 2221/2117* (2013.01)

(58) Field of Classification Search
CPC ........... G06F 17/3089; G06F 17/30289; G06F 17/30887
USPC ............... 707/781, 999.1, 999.102, 999.201, 707/999.202; 709/217
See application file for complete search history.

(56) References Cited

U.S. PATENT DOCUMENTS

| | | | |
|---|---|---|---|
| 7,007,034 B1* | 2/2006 | Hartman, Jr. | G06F 17/30038 707/812 |
| 7,143,091 B2 | 11/2006 | Charnock et al. | |
| 7,519,573 B2 | 4/2009 | Helfman et al. | |
| 7,949,642 B2 | 5/2011 | Yang et al. | |
| 8,135,589 B1 | 3/2012 | Reding et al. | |
| 8,255,819 B2 | 8/2012 | Chang et al. | |
| 8,286,076 B1 | 10/2012 | Szewczyk | |
| 8,370,358 B2 | 2/2013 | Lin et al. | |
| 8,429,099 B1 | 4/2013 | Perkowitz et al. | |
| 8,504,583 B1 | 8/2013 | Ke et al. | |
| 8,639,719 B2 | 1/2014 | Fisher et al. | |
| 8,682,989 B2 | 3/2014 | Meisels et al. | |
| 2003/0097640 A1 | 5/2003 | Abrams et al. | |
| 2003/0135464 A1 | 7/2003 | Mourad et al. | |
| 2004/0158496 A1 | 8/2004 | Tenorio | |
| 2004/0220926 A1* | 11/2004 | Lamkin | G06F 17/30017 |
| 2004/0223649 A1 | 11/2004 | Zacks et al. | |
| 2005/0131778 A1 | 6/2005 | Bennett et al. | |
| 2005/0138033 A1 | 6/2005 | Katta et al. | |
| 2005/0216454 A1 | 9/2005 | Diab et al. | |
| 2006/0041589 A1* | 2/2006 | Helfman | G06F 17/3089 |
| 2006/0206798 A1 | 9/2006 | Kohlmeier et al. | |
| 2007/0011608 A1 | 1/2007 | Titemore et al. | |
| 2007/0100829 A1 | 5/2007 | Allen et al. | |
| 2007/0106952 A1 | 5/2007 | Matas et al. | |
| 2007/0239761 A1 | 10/2007 | Baio et al. | |
| 2007/0266342 A1* | 11/2007 | Chang | G06F 17/30867 715/810 |
| 2007/0288518 A1* | 12/2007 | Crigler | G06F 17/30038 |
| 2008/0082349 A1 | 4/2008 | Zackrison et al. | |
| 2008/0109832 A1 | 5/2008 | Ozzie et al. | |
| 2008/0195664 A1 | 8/2008 | Maharajh et al. | |
| 2008/0201452 A1 | 8/2008 | Athas et al. | |
| 2008/0294981 A1* | 11/2008 | Balzano | G06F 17/21 715/256 |
| 2009/0006454 A1 | 1/2009 | Zarzar et al. | |
| 2009/0070689 A1 | 3/2009 | Park et al. | |
| 2009/0113301 A1 | 4/2009 | Fisher et al. | |
| 2009/0157711 A1* | 6/2009 | Baer | G06F 17/3089 |
| 2009/0249180 A1 | 10/2009 | Cheng | |
| 2010/0121877 A1* | 5/2010 | Fawcett | G06F 17/30286 707/769 |
| 2010/0299362 A1* | 11/2010 | Osmond | G06F 21/6218 707/781 |
| 2011/0043652 A1* | 2/2011 | King | G06F 17/2211 348/222.1 |
| 2011/0078585 A1* | 3/2011 | King | G06F 16/332 715/751 |
| 2011/0087516 A1 | 4/2011 | Frieden et al. | |
| 2011/0125784 A1 | 5/2011 | Cocheu et al. | |
| 2011/0179049 A1 | 7/2011 | Caldwell et al. | |
| 2011/0246937 A1 | 10/2011 | Roberts et al. | |
| 2011/0270851 A1 | 11/2011 | Mishina et al. | |
| 2012/0010995 A1* | 1/2012 | Skirpa | G06F 3/0481 705/14.49 |
| 2012/0023131 A1 | 1/2012 | Downey et al. | |
| 2012/0066581 A1 | 3/2012 | Spalink | |
| 2012/0076413 A1 | 3/2012 | Ferman | |
| 2012/0110443 A1 | 5/2012 | Lemonik et al. | |
| 2012/0117093 A1 | 5/2012 | Shilovitsky et al. | |
| 2012/0144315 A1 | 6/2012 | Rosenberger et al. | |
| 2012/0191728 A1 | 7/2012 | Libin et al. | |
| 2012/0278080 A1 | 11/2012 | Singh et al. | |
| 2013/0036117 A1* | 2/2013 | Fisher | G06F 17/30041 707/736 |
| 2013/0046761 A1 | 2/2013 | Soderberg et al. | |
| 2013/0054371 A1 | 2/2013 | Mason et al. | |
| 2013/0084000 A1 | 4/2013 | Bhardwaj et al. | |
| 2013/0124513 A1 | 5/2013 | Bignert et al. | |
| 2013/0173604 A1 | 7/2013 | Li et al. | |
| 2013/0185252 A1 | 7/2013 | Palmucci | |
| 2013/0185622 A1 | 7/2013 | Odean et al. | |
| 2013/0198642 A1 | 8/2013 | Carney et al. | |
| 2013/0204664 A1 | 8/2013 | Romagnolo et al. | |
| 2013/0212463 A1 | 8/2013 | Pachikov et al. | |
| 2013/0325870 A1 | 12/2013 | Rouse et al. | |
| 2014/0143250 A1 | 5/2014 | Martin et al. | |
| 2014/0201331 A1 | 7/2014 | Kershaw et al. | |
| 2014/0289645 A1 | 9/2014 | Megiddo et al. | |
| 2014/0304836 A1* | 10/2014 | Velamoor | G06F 21/6209 726/28 |
| 2015/0046260 A1* | 2/2015 | Engebretsen | G06Q 30/0256 705/14.54 |
| 2015/0046779 A1 | 2/2015 | Akselrod et al. | |
| 2015/0046827 A1 | 2/2015 | Akselrod et al. | |
| 2015/0161079 A1 | 6/2015 | Grosfeld | |
| 2015/0331914 A1 | 11/2015 | Cherukuri | |
| 2015/0379887 A1 | 12/2015 | Becker et al. | |
| 2016/0092416 A1 | 3/2016 | Kohlmeier et al. | |
| 2016/0134667 A1 | 5/2016 | Suresh et al. | |
| 2016/0285694 A1 | 9/2016 | Maes | |
| 2016/0299976 A1 | 10/2016 | Brunn et al. | |
| 2016/0371259 A1 | 12/2016 | Kohlmeier et al. | |
| 2016/0371352 A1 | 12/2016 | Kohlmeier et al. | |

FOREIGN PATENT DOCUMENTS

| | | |
|---|---|---|
| CN | 103020619 A | 4/2013 |
| CN | 103177075 A | 6/2013 |
| CN | 103189835 A | 7/2013 |
| EP | 1843256 A1 | 10/2007 |
| WO | 2014028300 A1 | 2/2014 |
| WO | 2015065776 A1 | 5/2015 |

OTHER PUBLICATIONS

Dontcheva, M. et al., "Collecting and Organizing Web Content," Personal Information Management—A SIGIR 2006 Workshop, 4 pages. Available at: http://citeseerx.ist.psu.edu/viewdoc/download?doi=10.1.1.116.4700&rep=rep1&type=pdf.

Chakrabarti, K. et al., "Entity Tagger: Automatically Tagging Entities with Descriptive Phrases," In 20th international conference companion on World Wide Web, published Mar. 28, 2011, 2 pages. Available at: http://research.microsoft.com/pubs/144170/pp1463-chakrabarti.pdf.

"Written Opinion of IPEA issued in PCT Patent Application No. PCT/US2014/050007", dated Jun. 12, 2015, 6 Pages.

"International Preliminary Report on Patentability Issued in PCT Application No. PCT/US2014/050007", dated Nov. 25, 2015, 6 Pages.

"International Search Report and Written Opinion received for PCT Patent Application No. PCT/US2014/050007", dated Dec. 15, 2014, 13 Pages.

"Office Action Issued in European Patent Application No. 14753419.2", dated Mar. 6, 2017, 6 Pages.

"Content Analysis Documentation for Yahoo! Search", Retrieved from: <<https://developer.yahoo.com/search/content/V2/contentAnalysis.html>>, Retrieved on: Apr. 2, 2013, 3 Pages.

"Getting Started with Evernote Web Clipper", Retrieved from: <<https://web.archive.org/web/20130308094407/http://evernote.com/webclipper/guide/>>, Mar. 8, 2013, 3 Pages.

(56) References Cited

OTHER PUBLICATIONS

"Final Office Action Issued in U.S. Appl. No. 14/318,930", dated Dec. 1, 2016, 18 Pages.
"Final Office Action Issued in U.S. Appl. No. 14/318,930", dated Feb. 20, 2018, 25 Pages.
"Non Final Office Action Issued in U.S. Appl. No. 14/318,930", dated Jun. 27, 2016, 17 Pages.
"Non Final Office Action Issued in U.S. Appl. No. 14/318,930", dated Aug. 9, 2017, 24 Pages.
"Final Office Action Issued in U.S. Appl. No. 14/470,491", dated Dec. 5, 2017, 15 Pages.
"Non Final Office Action Issued in U.S. Appl. No. 14/470,491", dated Apr. 6, 2017, 17 Pages.
"Non Final Office Action Issued in U.S. Appl. No. 14/470,491", dated Mar. 19, 2018, 26 Pages.
"Final Office Action Issued in U.S. Appl. No. 14/858,894", dated Jul. 12, 2018, 24 Pages.
"Non Final Office Action Issued in U.S. Appl. No. 14/858,894", dated Dec. 1, 2017, 20 Pages.
"Oral Hearing Issued in European Patent Application No. 14753419.2", Mailed Date: Dec. 21, 2017, 7 Pages.
"Office Action Issued in European Patent Application No. 14758726.5", dated Mar. 6, 2017, 6 Pages.
"Oral Hearing Issued in European Patent Application No. 14758726.5", Mailed Date: Dec. 21, 2017, 7 Pages.
"Office Action Issued in European Patent Application No. 14834796.6", dated Feb. 15, 2018, 6 Pages.
"Supplementary Search Report Issued in European Patent Application No. 14834796.6", dated Mar. 7, 2017, 9 Pages.
"Office Action Issued in Chinese Patent Application No. 201480044378.X", dated May 2, 2018, 10 Pages.
"First Office Action and Search Report Issued in Chinese Patent Application No. 201480044761.5", dated Aug. 15, 2018, 11 Pages.
"Office Action Issued in Chinese Patent Application No. 201480044794.X", dated May 2, 2018, 13 Pages.
Bendersky, et al., "Finding Text Reuse on the Web", In Proceedings of Second ACM International Conference on Web Search and Data Mining, Feb. 9, 2009, pp. 262-271.
Dontcheva, et al., "Relations, Cards, and Search Templates: User-Guided Web Data Integration and Layout", In Proceedings of the 20th Annual ACM Symposium on User Interface Software and Technology, Oct. 7, 2007, 10 Pages.
Edwards, et al., "Timewarp: Techniques for Autonomous Collaboration", In Proceedings of the ACM SIGCHI Conference on Human factors in Computing Systems, Mar. 22, 1997, pp. 218-225.
Lerin, Marisa, "10 Tips to Using Evemote", Retrieved from: <<https://www.pixelscrapper.com/blog/10-tips-to-using-evernote>>, Apr. 27, 2013, 9 Pages.
Mejova, et al., "Reuse in the Wild: An Empirical and Ethnographic Study of Organizational Content Reuse", In Proceedings of the SIGCHI Conference on Human Factors in Computing Systems, May 7, 2011, pp. 2877-2886.
Nguyen, et al., "Synthesizing Products for Online Catalogs", In Proceedings of the VLDB Endowment, vol. 4, Issue 7, Apr. 1, 2011, pp. 409-418.
O'Callaghan, et al., "A Strategy Development Process for Enterprise Content Management", In Proceedings of 13th European Conference on Information Systems, Jan. 1, 2005, 13 Pages.
Pan, et al., "Image Search by Graph-Based Label Propagation with Image Representation from DNN", In Proceedings of the 21st ACM International Conference on Multimedia, Oct. 21, 2013, 4 Pages.
"International Search Report and Written Opinion Issued in PCT Application No. PCT/CN2014/081107", dated Sep. 28, 2014, 13 Pages.
"International Preliminary Report on Patentability Issued in PCT Patent Application No. PCT/US2014/050009", dated Jul. 30, 2015, 8 Pages.
"International Search Report and Written Opinion Issued for PCT Patent Application No. PCT/US2014/050009", dated Dec. 15, 2014, 13 Pages.
"Second Written Opinion Issued in PCT Application No. PCT/US2014/050009", dated May 27, 2015, 7 Pages.
"International Search Report and Written Opinion Issued in PCT Application No. PCT/US2016/038589", dated Sep. 6, 2016, 13 Pages.
Viegas, et al., "Studying Cooperation and Conflict Between Authors with History Flow Visualizations", In Proceedings of the SIGCHI Conference on Human Factors in Computing Systems, vol. 6, Issue 1, Apr. 24, 2004, pp. 575-582.
Yi, et al., "Web Page Cleaning for Web Mining through Feature Weighting", In Proceedings of the 18th International Joint Conference on Artificial Intelligence, Aug. 9, 2013, pp. 43-48.
Yi, et al., "Eliminating Noisy Information in Web Pages for Data Mining", In Proceedings of the Ninth ACM SIGKDD International Conference on Knowledge Discovery and Data Mining, Aug. 24, 2003, 10 Pages.
"Non Final Office Action Issued in U.S. Appl. No. 14/858,894", dated Oct. 18, 2018, 18 Pages.
"Final Office Action Issued in U.S. Appl. No. 14/318,930", dated Jun. 28, 2019, 27 Pages.
"Third Office Action Issued in Chinese Patent Application No. 201480044378.X", dated May 5, 2019, 9 Pages.
"Final Office Action Issued in Chinese Patent Application No. 201480044794.X", dated Jun. 26, 2019, 9 Pages.
"Non Final Office Action Issued in U.S. Appl. No. 14/318,930", dated Dec. 31, 2018, 25 Pages.
"Second Office Action Issued in Chinese Patent Application No. 201480044378.X", dated Dec. 4, 2018, 12 Pages.
"Second Office Action Issued in Chinese Patent Application No. 201480044794.X", dated Dec. 5, 2018, 14 Pages.

* cited by examiner

ACCESS AND MANAGEMENT OF ENTITY-AUGMENTED CONTENT

CROSS-REFERENCE TO RELATED APPLICATION

This application claims the benefit of U.S. Provisional Application Ser. No. 61/863,241, filed Aug. 7, 2013.

BACKGROUND

Collecting content for later access, organization, and modification is facilitated by a variety of webpage and user-generated content capture tools and their associated collection and curation applications such as Microsoft OneNote® and Evernote® notebook applications. A "web clipper" is a tool that generally runs on a web browser at a client to enable clipping of content from a web page displayed from a web browser. Other tools and input mechanisms may be used to gather and save content. For example, audio or video may be captured by a microphone and camera; and certain text may be captured by a keyboard, keypad, touchscreen, or mouse.

Currently, content is generally captured as-is. That is, capture tools collect a full webpage, an entire selected portion of a webpage or document, a photograph, a screenshot, a recording or a subset of such content. In some cases, when clipping a uniform resource location (URL), a specified thumbnail or snippet that is found in the hypertext markup language (HTML) of the web page, is captured. Thus, content from a web page, document, or directly entered into an application by a user is able to be captured and stored for later use. In order to enhance such collections, a user may add tags and annotate the captured content; however, keyword tagging may not be uniform across users or consistent for a same user.

BRIEF SUMMARY

Access and management of entity-augmented content is described. A notebook application can be provided as a service enabling a user with a user account to access their notebooks across multiple devices. The user's content may be stored at a repository associated with the user account. Access and management of the user's content may be facilitated by, in response to receiving a request for content related to a specified entity from the repository associated with at least the user's account, identifying, in a content of a file in the repository, an entity container of at least one entity container associated with the specified entity; and communicating the entity container that is associated with the specific entity to a source of the request.

Content may be captured into the notebook application and stored in a defined structure—based on recognized entities—through a capture service that includes or communicates with an augmentation service. The structure can be an entity container, providing an object and one or more attributes of the object. The entity container can include content directly from the input content and content obtained from multiple sources across the Internet. The content can include a uniform resource identifier (URI) such as a URL (uniform resource locator), audio, video, image, photograph, word processing document, hypertext markup language (HTML) document, presentation document, Adobe® Portable Document Format (PDF), and the like.

The entity determination and corresponding entity container can be assigned as a marker to the content being clipped. The marker can be used to enable access and actions that can be taken with respect to the clipping or the structured information augmenting the clipping. From a notebook application, permissions to third party applications may be available based on entity type.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
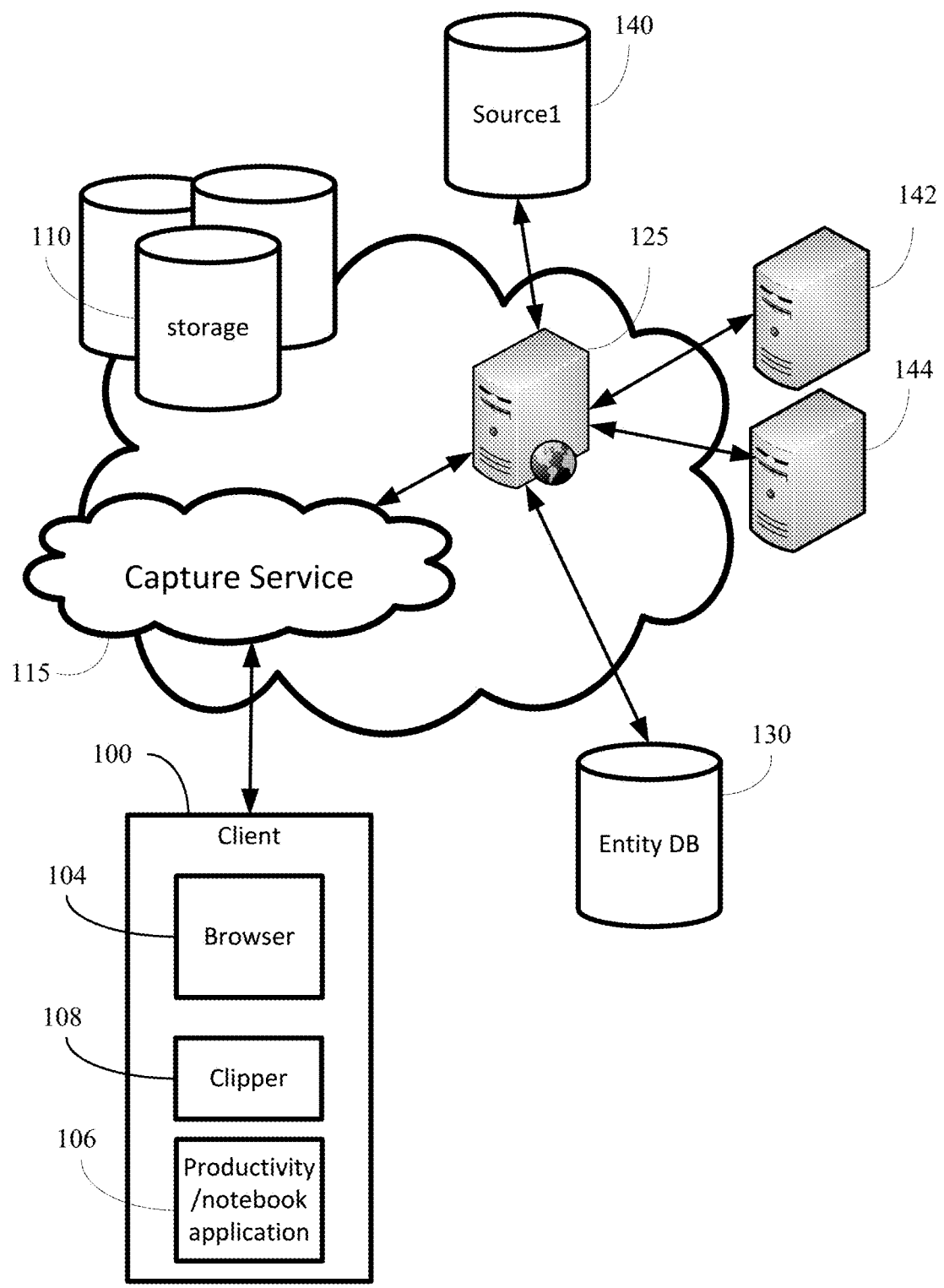
FIG. 1 illustrates an operating environment for capturing data.

Augmentation and other enhancements to content being collected, authored, consumed, or clipped are described. Access to and management of entity-augmented content is also described. Augmentation services are presented that may be provided as part of a capture service. Through capture services (that include augmentation services), a clip from a web page or other document can be processed in multiple ways depending on the nature and/or context of what is being clipped. In some implementations, a clipper, via a capture service, can recognize entities on a webpage during clipping, render a preview of the entity at clipping time, and capture the entity into storage in a structured manner that can be accessed and used later.

The content being clipped or otherwise captured can be, for example, audio, photos, video, formatting, style, layout and/or text from a webpage or other document file type (which includes file formats of HTML, PDF, Microsoft Word® document (DOC), Office Open Extensible Markup Language (OOXML) format (DOCX) and the like).

In some cases, document understanding technology may be used to parse the content in order to identify and understand objects on the page (e.g., entity type determination). This way it is possible to understand what is on the page, for example, if the content is about a movie, a book, etc.

An entity may refer to a person, place, thing, event, task, or concept. An object of an entity references a tangible form of the entity. An entity is a strong entity type if it has at least one specified attribute and is not dependent on another entity. For example, "The Lord of the Rings" names an object of a "book" entity type that can be defined with attributes that may include title, author, and International Standard Book Number (ISBN) number. The "book" entity can be considered a strong entity type, whereas "ISBN" is dependent on the book and would not be considered to be a strong entity type.

In some methods, a service makes an entity determination from content and creates an entity container for recognized entities. A client can receive the determined entity with the entity container providing an object and one or more attributes (attribute elements) of the object. In some implementations, the entity container further includes service elements. A service element can enable a user to take an action related to the entity (e.g., purchase an item, set calendar events, share and recommend an item). The services available for the service elements can be made available from a variety of online services. The attributes of the object can be obtained from multiple sources across the Internet.

Access and management of the user's content may be facilitated by, in response to receiving a request for content related to a specified entity from a repository associated with at least the user's account, identifying, in a content of a file in the repository, an entity container associated with the specified entity; and communicating the entity container that is associated with the specific entity to a source of the request.

In certain implementations, elements on a page being captured for a note (or retrieved from sources at various locations) can be arranged into structured data so that the information can be shown (e.g., rendered) in a contextual appropriate way. That is, a transformed view of the thing (i.e. the entity) the user is trying to capture can be presented and stored. This can also be adjusted for the device (for example, depending on available bandwidth, display screen size, viewing application, and other client-specific characteristics).

Advantageously, certain implementations provide the ability to capture structured content and maintain its semantics all the way though capture, recall, and reuse. This enables the user to capture what is truly of interest to the user and store it in a preferred location and format. Furthermore, upon recall, relevant information can be accessible at the right time and place.

Techniques are described that provide a user with content capturing options that recognize the subject matter of the content being captured and supply additional information relevant to the captured subject matter that is otherwise not immediately available to the user at the time of capture. This augmentation, along with other enhancements, can be automatic or performed in response to a user's request. Augmentation services are presented that may be provided as part of a capture service (e.g., a service associated with a notebook application such as Microsoft OneNote® or Evernote®).

The augmented content can include more specific and/or relevant content to that which is provided in the web page or other document. The capture services facilitate the augmentation of content by accessing additional information relating to the content and/or manipulating the content in custom and convenient ways.

The augmentation of the content can further facilitate taking action with the entity, the object of the entity, or the attributes of the object. The consistent structure of the entity container facilitates cross-platform and forwards-backwards compatibility. In addition, enhanced user experiences can be facilitated through understanding the subject (entity) that is being collected. Certain implementations apply structure and semantics to the user's notes in order to enhance the entire experience.

In some cases, the augmentation occurs at the time of collection (e.g., as a user is clipping content from a web page or following the input of an item to a note). In some cases, the augmentation can be performed while a user is modifying or manipulating content in a document, for example, in a note of a notebook application. In some cases, the augmentation can be performed when content is being saved into a document. Other cases may be suitable for automatic or user-requested augmentation as well.

FIG. 1 illustrates an operating environment for capturing data. Referring to FIG. 1, a capture service 115 can facilitate entity determination and augmentation of a clip or other content input to a notebook application to include entity-related features and/or functionality. As part of the entity determination, entity recognition can be performed with respect to the content being captured. This process may be performed locally at a client 100 or as part of the capture service 115.

A capture service 115 of an embodiment performs some processing to customize or augment the clipping for an application. The capture service 115 can provide augmentation services (either directly or indirectly) and may provide an application programming interface for augmentation services. The augmentation services may be provided integral with or independently of capture.

The capture service 115 can be web service that may be hosted in the cloud or run by one or more allocated servers by an entity providing the notebook service and/or the capture service.

A cloud service generally refers to hosted services providing scalable processing and storage capabilities. Cloud computing may often include virtualized resources. The resources presented by cloud computing are in themselves provided as a service, where cloud computing customers rent usage of resources from a third-party provider that owns the physical infrastructure. Web services can be provided and/or hosted by a cloud service (e.g., as part of a large-scale distributed computing environment). A web service is a software system that supports interoperable machine-to-machine interaction over a network and enables software to connect to other software applications.

A web service provides a collection of technological standards and protocols. For example, a web service provides functions that may be implemented by a software or hardware agent that sends and receives messages (e.g., the computing platforms requesting and providing a particular service). Applications can access web services via ubiquitous web protocols and data formats such as hypertext transfer protocol (HTTP), XML, JavaScript Object Notation (JSON), and SOAP (originally an acronym for simple object access protocol). The systems, applications and services described herein may exchange communications in accordance with one or more application programming interfaces (APIs).

Entry points for the services providing augmentation to content can be, for example, from clippers, readers, document or image viewers, word processing and other productivity applications, and collection and curation applications (and tools).

Client(s) 100 can be used to browse the Web and run applications such as a browser 104 and, in some cases, a productivity application or a reader or notebook application 106. Examples of browsers 104 include Microsoft® Internet Explorer, Google Chrome®, Apple Safari®, and Mozilla Firefox®. Examples of productivity applications, readers, and notebook applications 106 include Microsoft® Office, Microsoft OneNote®, Evernote®, Google Drive™, Google® Reader, Apache® OpenOffice, Zoho® Office, Apple® Reeder, and Apple iWork®.

A clipper 108 may be available at the client 100. A clipper 108 is locally running application that can be used to collect and capture content (including augmented content) for a user. Through the clipper 108, a user can select to clip the whole page, extracted portions of the whole page, one or more regions of the page and/or a recognized object/entity of the page (in the form of an entity container). The clipper 108 may be a web clipper, a clipping tool running on an operating system, an application having a clipping feature, or an augmentation feature of a notebook application, as some examples. The clipper 108 may or may not be directly associated with a destination application for the content.

A web clipper typically clips content from a website and inserts the content into a note or other application to which the clipper is associated. Web clippers generally run on a web browser 104 at a client 100. The web clipper may be implemented in JavaScript, as an example, and can be interoperable (and in some cases integrated) with the web browser 104. Because each web browser has different capabilities, web clippers may be configured based on the web browser.

In some cases, the clipper 108 may include a software tool associated with an operating system on a computing device (such as a tablet) that can be invoked to determine the entity that is most dominant on the screen at the time. For example, a touch or non-touch gestural swipe may be used to invoke the tool and get the entity (and in further implementations get the entity container for the dominant entity). As another example, a keyboard button (such as Print Screen) may be depressed to invoke the tool and get the entity.

In some cases, the clipper 108 is included as an add-on, plug-in, or bookmarklet for the browser 104 to clip content rendered in the browser 104. A bookmarklet is an extended functionality for a web browser, usually in the form of a JavaScript program stored as part of a bookmark in a web browser (or hyperlink on a web page). In some cases the clipper may be included as a feature of the operating system (not shown) to capture any content being rendered on a display (similar to a print screen function). In some cases, the clipper may be included as a web function or add-on of the productivity or notebook application 106.

In various embodiments, the clipper 108 can collect and capture content that is then stored in the "cloud" storage 110 or at another remote (non-local) destination. The content (and augmented content) can be stored in a repository associated with a particular user's account. The cloud refers to the storage and systems that are made available to a user over the Internet as part of a hosted service. The captured content may be stored locally at the client as well.

Content can be sent to a user's note or other application document through the clipper 108. The note or other application document may be stored in the cloud (e.g., in a repository associated with the user at storage 110). In some cases, a local copy of the note or other application is available. The note or other application document may be accessed or associated with the application 106 running on the client. The clipper 108 can provide content from the browser 104 (or some other application) to multiple notes and/or other application documents, as well as present additional functionality and enhancements through the capture service 115.

When using the capture service 115 to recognize an entity (or more than one entity) from the content, the capture service 115 may interface with the cloud storage 110 and/or destination storage (e.g., enterprise server or other specific remote storage) (not shown), for example by providing the content (and any enhancements or augmentation of the content) to the cloud storage 110 and/or destination storage. A locally running application (e.g., clipper 108) can call the capture service 115 (via an API).

In some implementations, as part of the augmentation, the capture service may communicate with a web data service 125 to obtain information from a database 130 of related structured content (also referred to as "structured knowledge" or a "knowledge graph"). The database 130 may be aggregated and hosted by search engine providers such as Google® and Bing®; however other knowledge base databases that are accessible over the Internet, other networks (private and/or public), or even on a user's local machine may be used. In one implementation, the capture service 115 can obtain structured content from database 130 directly.

In some cases, the related structured content can be generated on the spot. In one such case, the capture service 115 can communicate with a search engine service to perform a search. The search engine service can retrieve information from a variety of sources across the Internet (e.g., sources 140, 142, 144). In some cases, the search engine service may be separate functionality provided by the same provider of the web data service 125. In other cases, the search engine service may performed by a different provider.

The capture service can include an API to enable any application to capture an entity on a page, get an entity package, and even store the entity package for a designated application (or at a storage location, or repository, associated with a user and accessible by one or more applications). In some cases, where the page is a web page (or portion of a web page), a card can be obtained by the capture service from a search engine service. The capture service can detect the entity (or entities) of the page from the card.

The application or clipper can request to the service whether there is a recognizable entity for a page or document. The service can determine the dominant object (or objects) and provide an entity container for the object.

The capture service 115 may be implemented using one or more physical and/or virtual servers communicating over a network. In some cases, the capture service 115 may store or maintain an address of the clippings provided from the clipper 108 in the storage 110. The captured content (including entity containers) can be accessed directly from storage 110 or through the capture service 115 for inserting into different types of documents. In some implementations, other clients and servers may communicate with the capture service to utilize the functionality available from the capture service without using the clipper 108.

The various networks described and/or shown as part of the environment illustrated in FIG. 1 can include, but are not limited to, an internet, an intranet, or an extranet, and can be any suitable communications network including, but not limited to, a cellular (e.g., wireless phone) network, the Internet, a local area network (LAN), a wide area network (WAN), a WiFi network, an ad hoc network or a combination thereof. Such networks may involve connections of network elements, such as hubs, bridges, routers, switches, servers, and gateways. The network may include one or more connected networks (e.g., a multi-network environment) including public networks, such as the Internet, and/or private networks such as a secure enterprise private network. Access to the network may be provided via one or more wired or wireless access networks as will be understood by those skilled in the art.

Figure 2A:
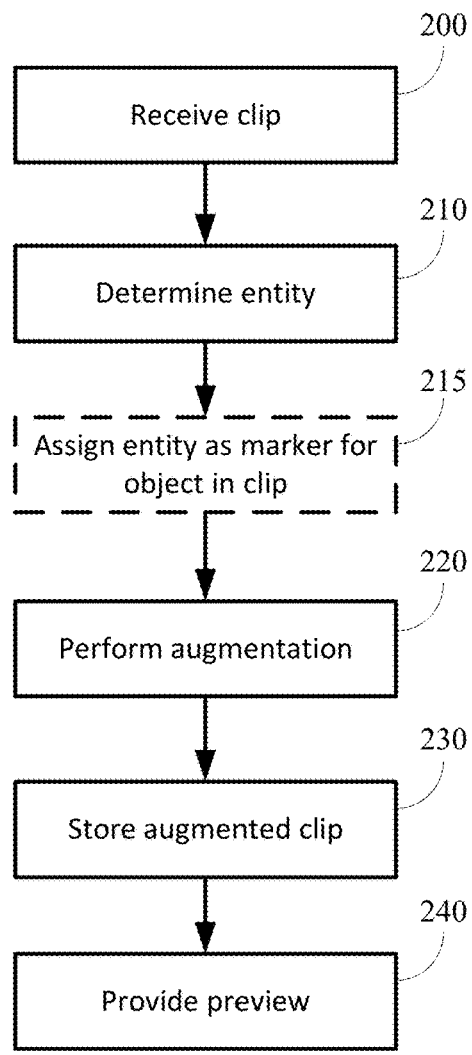
FIG. 2A illustrates an example process flow for a capture service according to an implementation.

FIG. 2A illustrates an example process flow for a capture service according to an implementation. Referring to FIG. 2A, in response to receiving a clip or other content for input to a notebook application (200), an entity determination can be performed (210).

The entity may be automatically resolved or a user may select the type of entity. In some cases, a combination may be appropriate, for example where there is not enough information to determine with a certainty above a threshold that the dominant object is a particular entity.

In some cases, the clip includes a marker or tag indicating the entity type. When the clip includes the indication of entity type, the entity determination can include reading the tag or marker.

In some cases, the entity determination includes analyzing the content of the clip to determine the entity of the clip. The entity of a document or web page can be identified in response to receiving the clip. The entities being identified for use in this case are the strongly typed entities. Any suitable technique for identifying a dominant entity may be used. For example, classification, image recognition, text mining, semantics, and ontology frameworks may be utilized to identify dominant (and non-dominant) entities from a string or other content format.

In some cases, the entity determination involves contacting a search engine service (or other web data service) to request information about a URL, for example, in the form of a "topic card" (defined here as structured and unstructured information about the entity), which can include an indication of the entity (or entities) associated with a web page. In some cases, multiple "topic cards," or models, may be available for a URL.

After the entity is determined (210), the content being collected ("clipped") or otherwise input to a notebook can then be associated with the strongly typed entity in the form of a marker (215). Although this step is illustrated as occurring before performing augmentation (220), the assignment of the marker may be performed at any time after the entity is determined, including after performing augmentation, at a time of storing the clip, and even after providing a preview of the clip.

The marker is similar to a "tag" that can be stored as part of the metadata of the document or page. The marker may even be used as a tag. However, the marker can be associated with an element or object within the document or page as well as the metadata of the page itself. In addition, the marker facilitates additional functionality specific to being a recognizable entity and, in some cases, includes a schema providing a specified structure for attributes of the object being marked. That is, different from a tag, the entity marker presents a standard schema of how to store information related to that entity. While any metadata can be added to describe a page, tagging tends to not be uniform.

In some cases, there may be multiple entities on a same page. For example, a search results page may have multiple wines. As another example, a blog post may include a recipe (one entity) and an article (another entity) about a region visited by the author. Multiple objects of a same entity type or multiple objects of different entity types can be recognized and stored in their corresponding structure.

In some cases, the entities associated with content may each have a confidence value and the content may be marked as an entity with a confidence value above a certain threshold. In some cases, multiple strong entities may exist on a page or document. The individual sections can be marked with their corresponding entity and the page or document as a whole may be marked with the multiple entities.

In some cases where the captured content may include multiple entities (or a situation where it is not possible or easily achievable to narrow results to a single entity based on the content that is captured), the entity determination can include outputting a list of available entities understood by the capture service and determining the entity in response to receiving a selection of one of the available entities. In some cases where an object may exist in different entity forms, for example as a book and a movie, a feature can be included that enables a user to correct or select the entity being referred to. This situation may arise when there are two or more entity types that are applicable to the same general subject matter.

Once an entity is determined (210), augmentation can be performed according to the entity (220). The augmentation can be creation of an entity container, an entity-related processing, or a combination of the two.

The entity container refers to the package of information having a structured schema specific to the entity type. The entity container can be generated in response to receiving a request for an entity container from an application (or clipper) or automatically generated in response to receiving the clip or some other specified event invoking augmentation. The entity container presents a structured collection of data based on a determination of the dominant entity (or entities) of a clip (which may be an entire page or a region selection of a page). When multiple entities are found on a page, each may be identified and their corresponding structured collection of data presented (and/or stored).

A strongly typed entity container is not simply a keyword (or keywords) describing the object. Instead, the entity container provides "what" the thing/object is (e.g., a "book"); provides action(s) that may be taken on the entity (e.g., read reviews about a "book"); enables access to the entity container (e.g., made available to third parties that have permission to access "book" or provide tags for queries); and enables actions to be performed (e.g., "books" can be sent to a wish list of an online book store).

In some cases, the entity container can be generated from one or more cards (or "models") received from a search engine service. The card can include the entity information as well as various attributes related to the object of the entity. Since the search engine service has already analyzed the page and prepared a card, additional analysis to determine an entity associated with the captured content from the local application or the capture service may be omitted.

When the URL of a web page is used to request the associated entity from the search engine service, the card provided for indicating the entity can also be used to generate the entity container.

For the entity-related processing, the clip can be processed or transformed in a number of ways. In certain implementations, the processes can include removing advertisements from main content of a web page or looking up entity tags embedded in HTML of a page by the page author.

In some cases, the transforming can include separating readable text from the rendered content to generate an image from the readable text. In some cases, the transforming can include providing hyperlink recognition so that internal links shown in the image can be made "live" and selectable. In some cases, the transforming can include removing repetitive background content from the rendered content. The transforming can be any combination of the above or other types of transformational processes including filtering, text recognition, image recognition, and tagging.

In some cases, from a selected region (or even a full page capture), the capture service can process the data based on recognizable aspects of the data. For example, a selection that contains mostly text can be recognized as an article, and processes can be performed to filter or remove content or other data deemed not relevant by the system in order to present a "clean" view of the data. The "clean" view can be defined by the implementation. An example of a "clean" view is where advertisements and banners are removed from a web page.

As another example, images or multiple pages of the article may be fetched when the clip is recognized as an article.

As yet another example, when a destination for the clipping is a reader application, the HTML of the page can be analyzed to determine whether there is a certain amount of text on the page (to classify the page as a blog, editorial, article, and the like) and a cleaning program can be applied to remove advertisements and/or format the text or other content for reading. In another implementation, the cleaning program may identify portions to keep and extract those portions from the HTML while leaving the ads and any unwanted information behind. Recognition of an "article" can also generate a preview of the container for the article entity in place of or in addition to a preview of the article itself.

In some cases, the processes performed by the capture service include calling another web service or performing processing to determine metadata associated with the content of the web page. The metadata can include topical tags that may then be included with the HTML file or the image to help with search or other processes that may be carried out after capturing the web page. Topical tags include tags related to the content based on the context, images, topics, or other related topics. Certain tags may be suggested or automatically provided based on the recognized entity. For example, if the entity is a book, then a suggested tag may be "to read".

The augmented clipping can be stored (230) and, optionally, provided to the client in a preview (240).

Figure 2B:
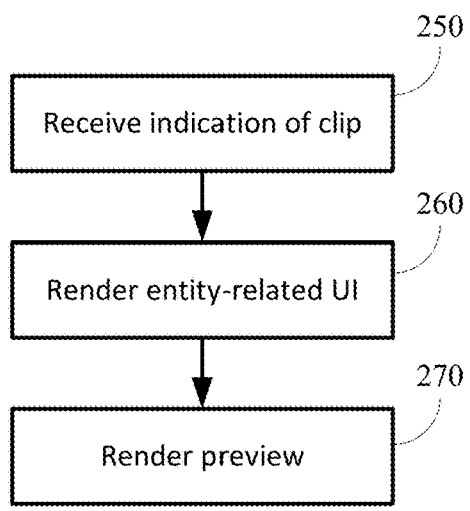
FIG. 2B illustrates an example process flow for a clipper according to an implementation.

FIG. 2B illustrates an example process flow for a clipper according to an implementation. Referring to FIG. 2B, a clipper may receive an indication of a clip (250). The indication may be received through a clipper user interface. The entity may be determined at the client (as part of a process at the clipper) or at the capture service. Entity-related features of the user interface may be rendered once the entity is resolved for the clip (260). One embodiment provides a customized window pane based on a recognized entity. Custom strings can be utilized for different entity types. Some examples are illustrated in FIGS. 6A-6E.

A preview can be rendered for the clip (270), and the preview may show the augmentation available for the clip. When captured through a clipper, a preview can be rendered for the clip within a graphical user interface associated with the clipper. The preview may be rendered in a separate window or pane from the content or within the same document as the content.

In some implementations, a customized view (or format) can be presented based on a recognized entity. In some cases, the entity container structure with the appropriate content for the specified attributes can be arranged in a particular manner. For example, a presentation of a book entity type can include an arrangement that fits within a rectangle (or other shape) of certain proportions with an image of the book cover at one location, a summary of the book in a specified font at another location, the author's name at yet another location, and the ISBN number at a bottom location.

In some cases, a service element may be included at a particular location. This service element may be a graphical representation of, for example, a "buy now" request to launch online bookseller sites or a synopsis request to launch a study guide application. As other examples, a "movie" can include a service element to purchase a ticket, and an "airline ticket" can include a service element that displays up-to-date information on flight status.

Figure 3A:
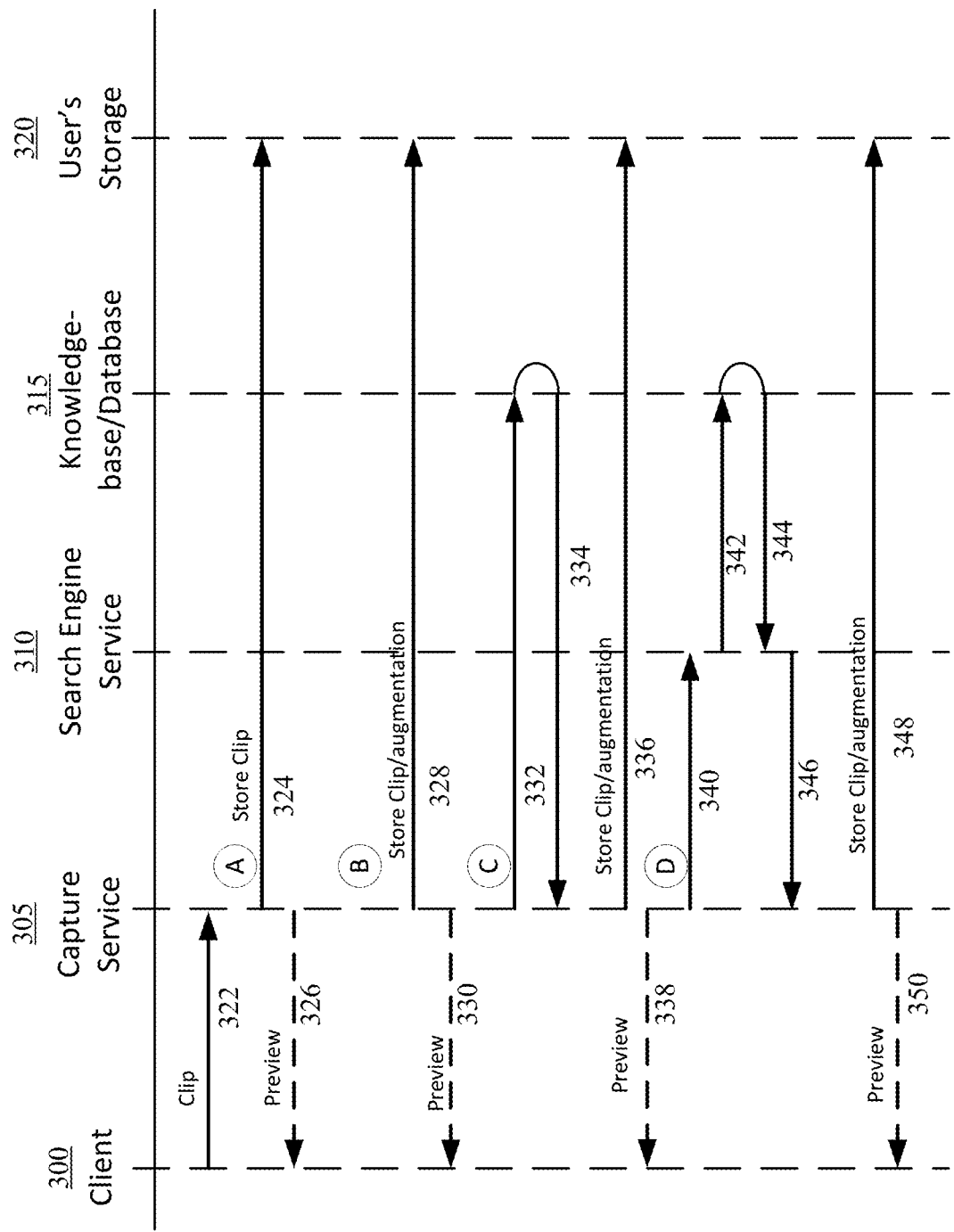
FIGS. 3A and 3B illustrate system architecture diagrams with process flows for certain implementations.
Figure 3B:
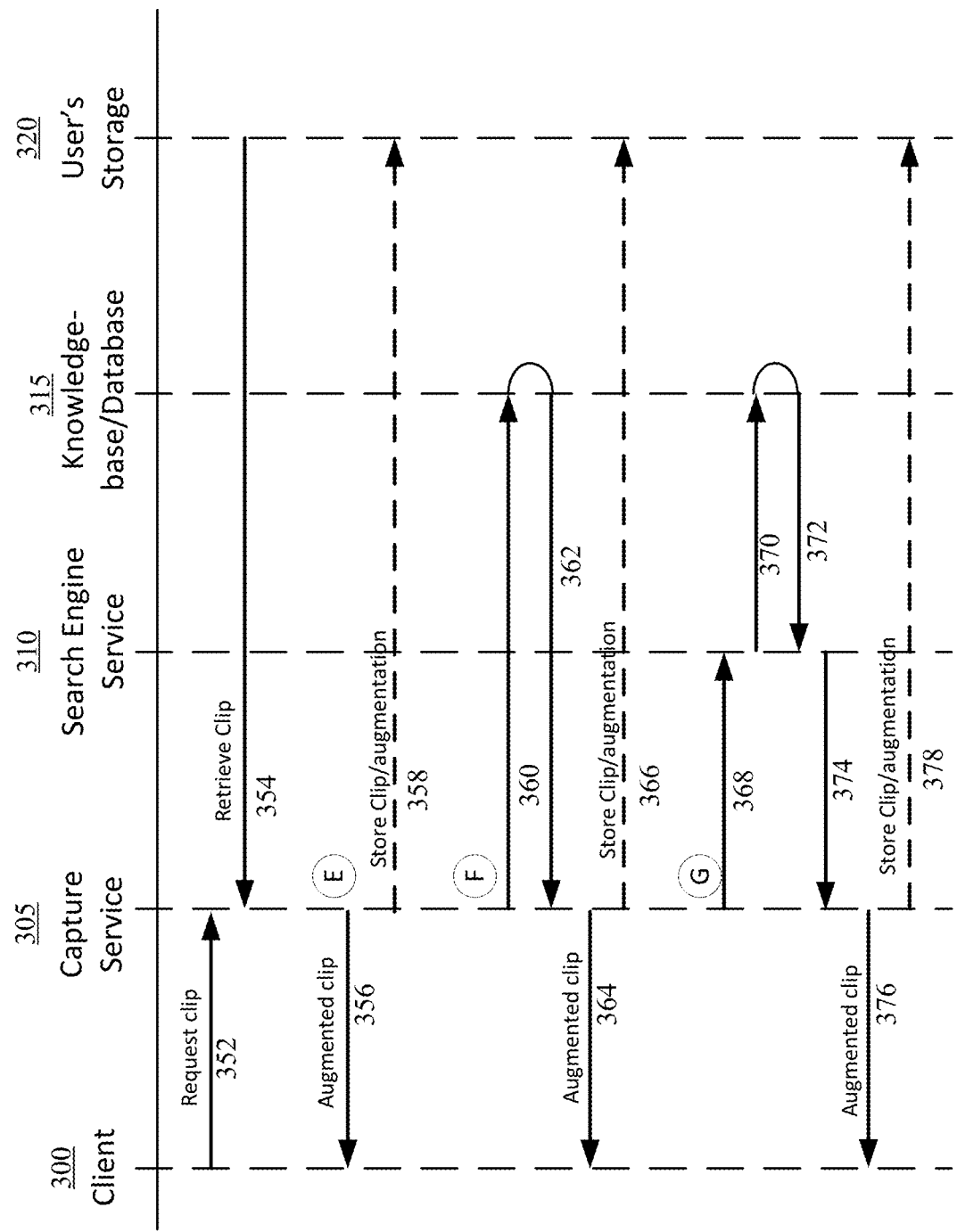

FIGS. 3A and 3B illustrate system architecture diagrams with process flows for certain implementations. The operating environment can include client 300, capture service 305, search engine service (a web data service provided by a search provider) 310, knowledgebase/databases 315, and user's storage 320.

Referring to FIG. 3A, a clip 322 can be sent from a client 300 to a capture service 305. In some cases, the source of the page is sent in its entirety to the capture service. In other cases, a portion of the source is provided, and yet in other cases the URL is sent and the content retrieved at the server (by the capture service 305). In a basic case, as illustrated in case A, the capture service can store the clip (324) without augmentation in the user's storage 320 and in some implementations a preview 326 can be generated at the client 300.

Cases B, C, and D illustrate various configurations for facilitating augmentation. In case B, augmentation can be carried out at the capture service 305, for example, various processes involving removal of advertisements or formatting text for reading. Thus, after receiving the clip 322, the clip and augmentation can be stored (328) and optionally provided as a preview 330.

In one implementation, the capture service 305 may include a database of entities with associated cards (or contact another service that has a database of entities with associated cards) and can retrieve the topic card from this database. A look-up table may be used to get the corresponding card of a specified entity.

For example, in case C, entity recognition and augmentation can be carried out by the capture service 305 through direct access of a knowledge base or database 315. In response to a communication 332 from the capture service 305, data (334) from the knowledgebase/database 315 can be provided to the capture service and used to generate an augmented clip 336, which can be stored in the user's storage 320 and optionally provided for preview 338.

According to an example implementation, the capture service 305 can call a search engine service 310, for example, the Google® or Bing® search engine service, with an entity to request the topic summary or topic card from the Google® or Bing® service.

For example, in case D, when the clip is content from a web page, the entity recognition may have already been performed by a search engine feature. In such cases, the URL of the web page may be sufficient to send to the capture service 305, which requests (340) the entity (or entities) on the page from the search engine service 310. The search engine service 310 may access (342) knowledge base or database(s) 315 (which may be the same or different ones than directly communicated with by the capture service) to retrieve a topic card (344) for the web page. The search engine service 310 may then provide the card 346 (along with any other search results that may be requested by the capture service 305) to the capture service 305. The augmented clip 348 can be stored at the user's storage 320 and optionally provided as a preview 350.

As described, in some cases, a preview may be presented. In other cases, the clipper collects the content and sends the content directly to storage (without a preview).

A preview of the clip can be provided by the capture service to the client and/or the clipper running on the client may render the preview. The preview can be rendered in a preview pane or window in the browser. The preview pane can be part of a clipping user interface in which editing, tagging, and other actions may be accomplished. For example, the user can add a tag or a comment to the clip via the user interface. In addition, the destination for the clip may also be configured from within the user interface. In some cases, a drop-down menu or input field can be used to indicate a specific destination. As an example, a user may select a notebook name or reading collection. A predicted destination may also be presented in the preview pane. For example, using entity recognition and auto-tagging, the clipper, or capture service, may determine that a user is looking for a house and recognizes elements of a webpage related to houses that then get saved to the user's housing notebook. Similarly, when recognizing the entity of a movie, such a clipping could automatically go into the user's movie notebook.

Referring to FIG. 3B, a clip 322 can be sent from a client 300 to a capture service 305. As previously described, in some cases, the source of the page is sent in its entirety to the capture service. In other cases, a portion of the source is provided, and yet in other cases the URL is sent and the content retrieved at the server (by the capture service 305). In the basic case (case A) illustrated in FIG. 3A, the capture service can store the clip (324) without augmentation in the user's storage 320.

Cases E, F, and G illustrate various configurations for facilitating augmentation after the clip (which may or may not have had augmentation performed) is stored. When a user retrieves the clip (such as clip 322) from the user's storage (354) for viewing and/or editing at the client 300, the client 300 may contact the capture service 305 to retrieve a stored clip (via request 352). As illustrated for case E, the capture service 305 can automatically perform augmentation on the clip before providing the clip to the client 300. For example, various processes involving removal of advertisements or formatting text for reading may be carried out. Once the augmentation is performed, the augmented clip 356 can be provided to the client 300 and stored (358) at the user's storage 320.

In one implementation, the capture service 305 may include a database of entities with associated cards (or contact another service that has a database of entities with associated cards) and can retrieve the topic card from this database. A look-up table may be used to get the corresponding card of a specified entity.

For example, in case F, entity recognition and augmentation can be carried out by the capture service 305 through direct access of a knowledge base or database 315. In response to a communication 360 from the capture service 305, data (362) from the knowledgebase/database 315 can be provided to the capture service and used to generate an augmented clip 364, which can be provided to the client 300 and stored (366) in the user's storage 320.

In another implementation, such as illustrated in case G, the capture service 305 can call a search engine service 310, for example, the Google® or Bing® search engine service, with an entity to request the topic summary or topic card from the Google® or Bing® service. The capture service 305 may use a URL associated with the clip to request (368) the entity (or entities) on the page from the search engine service 310. The search engine service 310 may access (370) knowledge base or database(s) 315 (which may be the same or different ones than directly communicated with by the capture service) to retrieve a topic card (372) for the web page. The search engine service 310 may then provide the card 374 (along with any other search results that may be requested by the capture service 305) to the capture service 305. The capture service can use the card 374 (and any other data provided) to augment the clip and provide the augmented clip 376 to the client 300 and store (378) the augmented clip at the user's storage 320.

Figure 4:
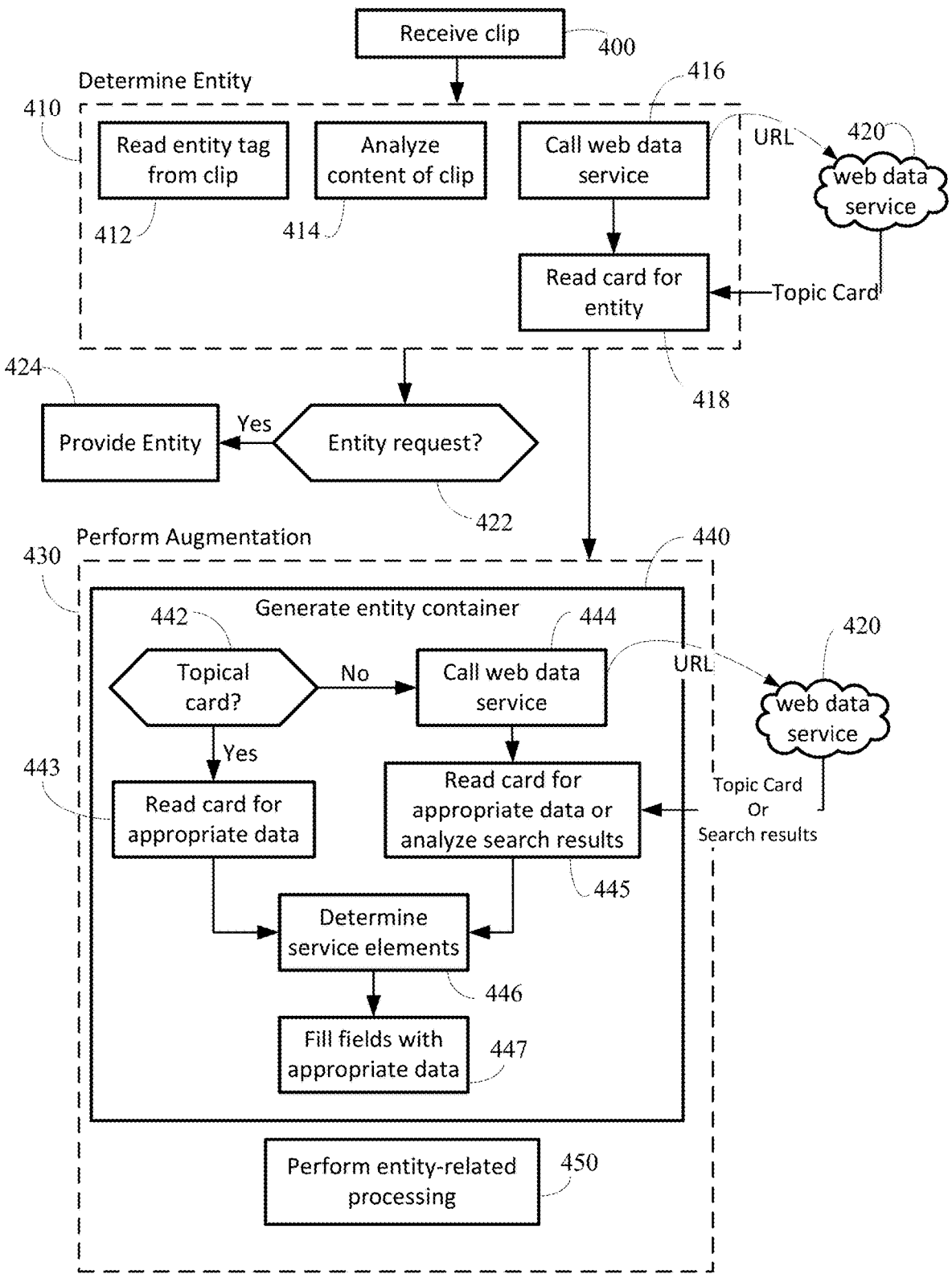
FIG. 4 illustrates an example process flow for a capture service according to an implementation.

FIG. 4 illustrates an example process flow for a capture service according to an implementation. A clip of a web page or other document may be received (400) at the capture service in order to perform augmentation. Once received, the entity or entities of content on the page or other document is determined (410). Determining the entity of an object in a clip may be accomplished by reading an entity tag from the clip (412), analyzing the content of the clip (414), and/or calling a web data service (for example available from a search engine provider) (416) by sending the URL of the clip as part of the request to the web data service 420. In some cases, when analyzing the content of the clip (414), the entity determination can be accomplished by analyzing the HTML dominant object model (DOM) of the clipped web page (or other document). In some cases, when using the topic cards from the web data service 420, the entity can then be determined in operation 418 when the one or more topic cards (the structured and unstructured information about the entity/entities on the page) are received from the web data service 420. If the capture service received an entity request (422), then the entity determined in operation(s) 410 can be provided to the application/device that made the request.

As part of the augmentation process, information received from the web data service (and/or search engine service whether same or different providers) can be used to create an entity container. Information from the clip itself can be used to populate the entity container and facilitate the creation of the entity container.

The creation of an entity container (e.g., "augmentation") may be carried out in parallel to or in serial with entity determination. In some cases, entity determination occurs as a result of or as part of the entity container creation process. In some cases, the result of the entity determination directs the entity container creation process.

As an example, during operation 416, when the capture service calls the web data service 420 with the URL, the web data service 420 can provide a cached version of the properties of the webpage identified by the URL stored in a database of the web data service. The entity determination can be read from the card (418) and the card information can be used to generate the entity container (440). For example, if a topic card is received (442) (because of being requested during operation 416), the card can be read for the appropriate data (443). The entity container may be the card or may be a modified version of the card provided by the web data service.

If the capture service does not yet have the topic card, the capture service can call the web data service 420 with the URL (444), and, in response to receiving the topic card(s) from the web data service, the capture service can read the card for appropriate data (445). In some cases, a card is not available for a URL or the document (or other item received by the capture service) does not have a cached version stored in the database for some reason (e.g., no URL may have been provided or is available).

In the case that no card is available (and even in the case that a card is available), the capture service can call a search service (which may be provided by the same provider of the web data service) and request a search be performed (see also operations 444 and 445).

For example, when the keyword is the name of a composer, the curated card may include a picture of the composer, date of birth, family members, famous works and, in some cases, other composers either commonly searched or of some other relationship to the composer. This type of curated card is currently being used on search engine sites to enhance certain search results; however, certain embodiments can provide this functionality outside of the search engine web site and without requiring a user to enter search terms.

That is, the capture service determines the entity that the user intends to capture from a page, makes the connection to the search service, which may only receive key words, receives the card from the search service, and generates an entity container from the card as well as other information requested and received from a variety of sources across the Internet. For example, service elements may be included in the entity container and upon determining the desired and/or available service elements (446), the fields of the entity container can be filled with the appropriate data (447). The augmentation can also include performing entity-related processing 450. An entity container generated in this manner may be rendered in a preview while the user is on effectively any web page or document.

The capture service can, in addition to relying on search engines, identify key entities itself via natural language processing and related statistical and/or heuristics-based techniques.

Figure 5A:
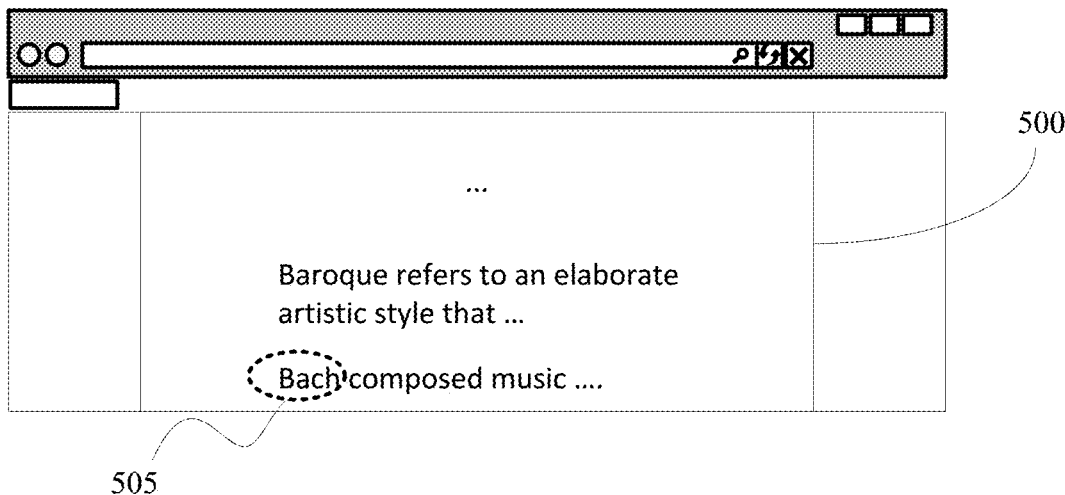
FIGS. 5A and 5B illustrate an example scenario in which a recognized entity in a web clipping can generate an entity container.
Figure 5B:
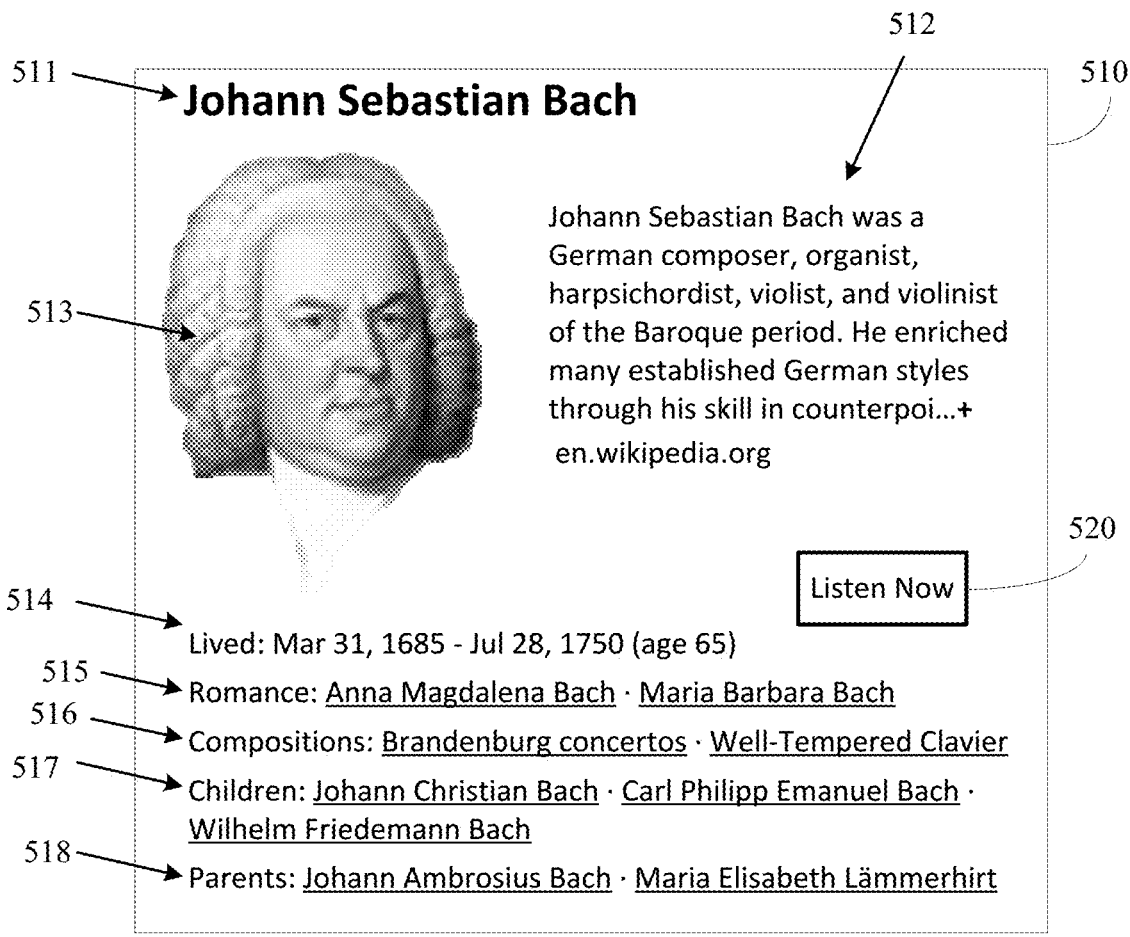

FIGS. 5A and 5B illustrate an example scenario in which a recognized entity in a web clipping is assigned an entity container. Referring to FIG. 5A, a user may be conducting research on the Baroque period for a school course. While viewing a web page 500, the user may decide to clip the page to a note.

According to an implementation of the automatic augmentation technique, an entity container can be generated for the dominant entity or entities of the web page 500. When invoking the capture service, the dominant feature of the webpage may be determined and this dominant feature associated as a strongly typed entity (also referred to as a "strong entity type"). More than one entity may be recognized on a page.

A dominant entity on the page 500 may be Johann Sebastian Bach (505). The determination of the dominant entity may be performed at the clipper (locally) or at the capture service. In some cases, the user may indicate the entity of interest; whereas in other cases, the entity determination is performed in the background and/or without user input.

The capture service can, in response to determining that the dominant entities on the page include the composer Johann Sebastian Bach, generate an entity container. The clipping can be captured into storage with the entity container(s) for the recognized entity (or entities). The entity containers can be available for strong entity types recognized on a page of a clipping.

The entity container 510 shown in FIG. 5B may be rendered at the user's device as a preview. It should be understood that the entity container shown in FIG. 5B is merely illustrative of elements that may form an entity container and should not be construed as requiring the elements shown or limited only to those shown. Referring to FIG. 5B, the entity container 510 may include the composer's name attribute element 511, a summary attribute element 512, an image attribute element 513, a life span attribute element 514, a relationship/spouse attribute element 515, a children attribute element 517, a parents attribute element 518, and a "listen now" service element 520.

In certain embodiments, the clipper interface can indicate the recognition of a particular entity related to the content being rendered in the viewing pane of the browser or other application. For example, if a user is viewing a website relating to books, the layout, text, or other features of the clipper interface can make it apparent that the clipper recognizes that the user is viewing a web page relating to books.

The clipper can direct content presentation and, optionally, provide the user with additional information. The content presentation may include a simple description of the recognized entity, for example, "Book" or a preview of the entity container for the recognized book on the web page. The additional information could be related to, for example, competitive pricing of books. For example, if the user were clipping information from Amazon.com, the augmented clipper might also automatically provide prices from other book-selling websites.

Once the entity type is recognized—or as part of the process of recognizing the entity type for a clip, the capture service can obtain elements (attribute elements and service elements) that relate to the object of the entity from one or more sources.

According to various implementations, the capture service can provide the relevant information (the elements) in a form suitable for the particular entity type. This form can be a package of elements that make sense in relation to the identified thing (i.e., the entity"). A difference between tagging and entitizing is that determining the one or more entities in a document or on a webpage generates a layout or format specific to the entity as opposed to simply providing additional metadata for the file. Text, audio, images, and video can be captured by the application and the subject of this content can be captured.

In certain implementations, the entity container schema can be configured according to an ontological database or catalog such as available from schema.org—a public repository of schematizing the world. The schema can include a list of properties associated with an object. The list of properties can then be used to get information to fill out the schema. Layout templates may also be included so that the view of the entity container (with filled attributes) may be consistent but can be customized for each client or context (e.g., how the information is presented in the preview pane or on a mobile phone).

In any of the described implementations described, service elements can be included in the augmentation (for example, as part of an entity container). Because the identity of the stored object is known (is an entity) as opposed to HTML, applications that act on such entities can be interfaced with or given access to the object or aspects of the object.

An example of a service element is a calendar event. A calendar service can be implemented to set a reminder or generate a message based on the entity. Reminders can be contextual to the kind of information captured. In some cases, a location service may be incorporated in which a reminder can be sent when a device is within a certain distance of a store or other location. For example, a "remind me when I am in a bookstore" can be arranged through the service element to prompt a user when the user (the user's device) is in a bookstore to get a book; or a "remind me when I am at the movie theater or on a ticket site" to prompt the user to see a movie or purchase a ticket.

Additional functionality could also be set through the service element. For example, a recipe entity can include a service element that generates a shopping list when the user is in a grocery store.

Although an "article" may not be a strong entity, the topic of the article can be determined and additional services enabled through one or more service elements of the article entity container. For example, related news may be retrieved based on a common topic. As another example, updates to the topic (e.g., a newer article or a correction to the article) may be presented or recommended.

The strong entity types assigned by the augmentation of the clipping available through the capture service enable additional functionality to be presented.

From a notebook application, permissions to third party applications may be available based on entity type. For example, the notebook application can be configured to permit a reader application to access "books" for tagging, reading, or other specified actions. Instead of permissions based on hierarchy (e.g., specific to a page), permissions can be set permissions based on "entity." This enables access to elements of a page instead of a page as a whole. The elements that are accessed are the elements marked as a strong object, not necessarily the other information on the page (unless permissions are granted for that other information and/or the other information on the page is the attributes of the entity).

Because the entity is stored in the form of an entity container, accessing the entity container (based on permissions to a particular entity type) avoids accessing the user's private information. Instead, the information from the entity container is public information obtained from sources across the Internet and generated by a search engine. For example, a user's note may discuss character development in a novel. The novel may be marked as a strongly typed entity of a "book". Because the novel is marked as a book, the entity container for that novel is stored with the page or objects on the page of the note. Then, when an application granted access to the books in the note accesses the books, the information received by that application is the entity container and not the discussion of character development or other text on the page of the note.

What follows are a number of screen shots associated with aspects of the subject disclosure as provided with respect to a computing device. Such screen shots are merely exemplary and provided to graphically depict at least one embodiment of aspects of the disclosure. Of course, the subject disclosure is not intended to be limited to the location or presentation of graphical elements provided since there are a myriad of other ways to achieve the same or similar result.

It should be understood that these case examples are meant for illustrating how certain features may be implemented and should not be construed as limiting in layout, functionality, features, or scope.

Entity-related UI may be rendered. For example, custom strings can be utilized for different entity types. FIGS. 6A-6E illustrate example entity designators. Once a dominant entity is recognized from a webpage being clipped, a designated response may be displayed to the user. Referring to FIG. 6A, a webpage 605 having a dominant entity of a movie can result in a designated response 610 referencing the entity type "movie" in the clipper pane 615. Thus, if the user clips content that contains a recognized entity of a movie, the displayed string can indicate "Movie Watchlisted" as shown in FIG. 6A.

Figure 6B:
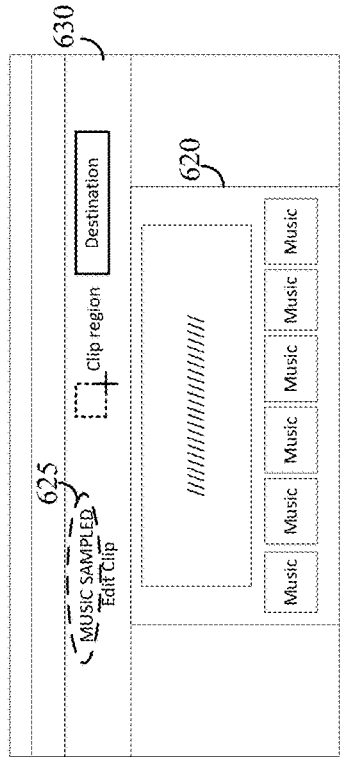
FIGS. 6A-6E illustrate example entity designators.

In FIG. 6B, a webpage 620 having a dominant entity of a song can result in a designated response 625 referencing the entity type "music" in the clipper pane 630. For example, "Music Sampled!" could be the message for a music site.

Figure 6D:
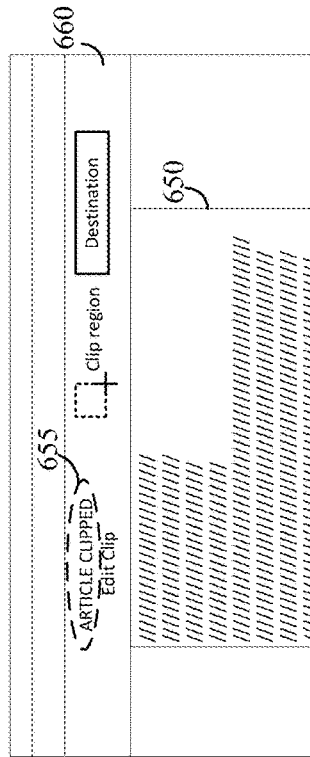
Figure 6A:
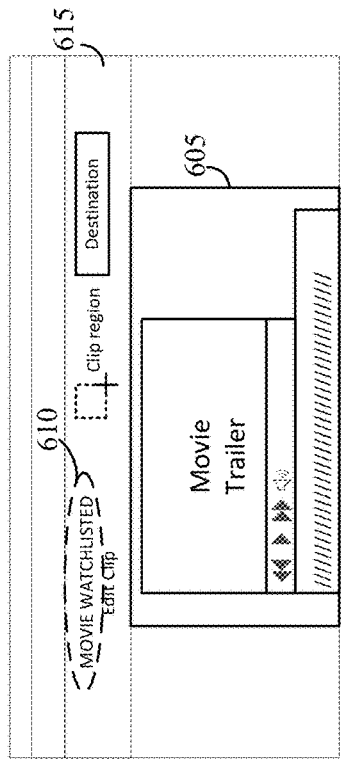
Figure 6C:
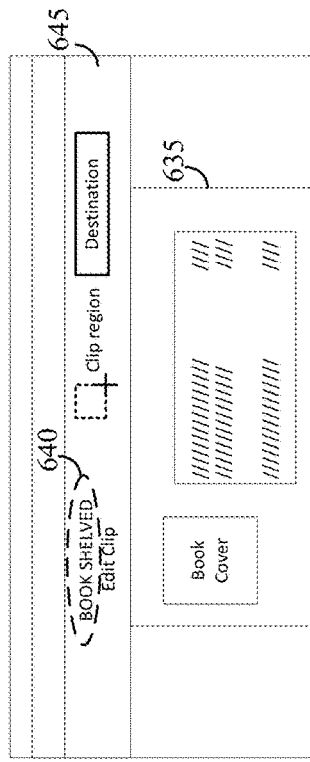

In FIG. 6C, a webpage 635 having a dominant entity of a book can result in a designated response 640 referencing the entity type "book" in the clipper pane 645. If a user clips content that contains a book, the displayed string can indicate "Book Shelved!" as illustrated in FIG. 6C.

In FIG. 6D, a webpage 650 having a dominant entity of an article can result in a designated response 655 referencing the entity type "article" in the clipper pane 660. For example, "Article Clipped" may be displayed when the content is determined to be an article entity.

Figure 6E:
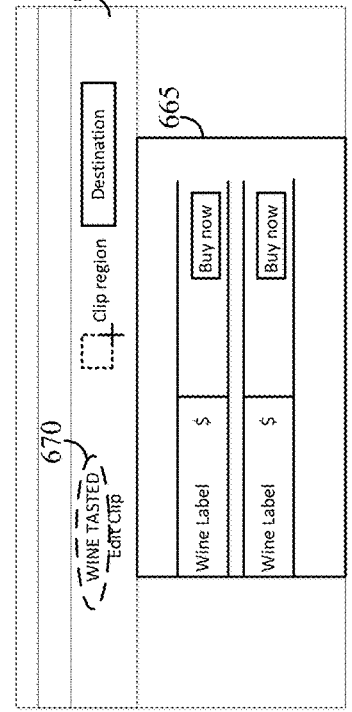

In FIG. 6E, a webpage 665 having a dominant entity of wine can result in a designated response 670 referencing the entity type "Wine" in the clipper pane 675. For example, after clipping at a wine website, the message "Wine Tasted!" can be displayed.

In each example, the same information is being conveyed—a confirmation of the identity of the "thing" to which the site pertains and that the material is clipped and saved.

Figures 7A, 7B, 7C:
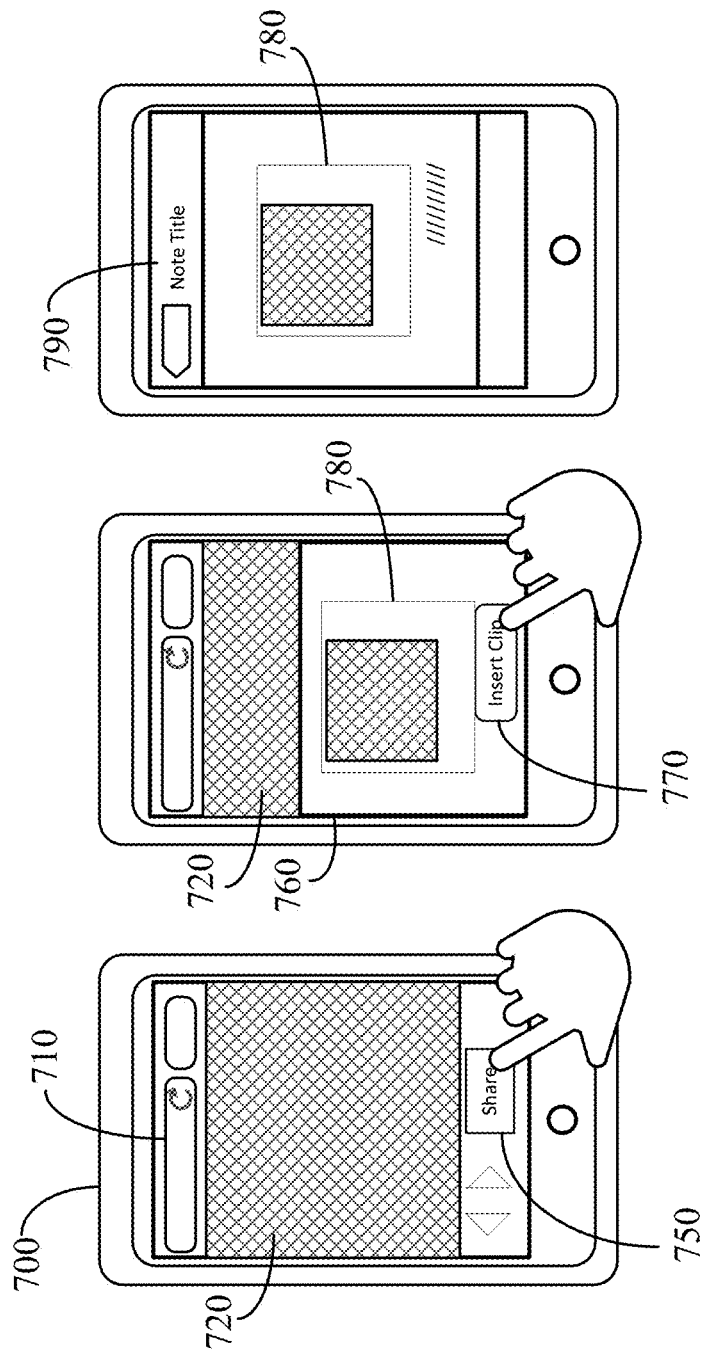
FIGS. 7A-7C illustrate a scenario for a notebook application that may be implemented on a mobile device having a web browser client.

FIGS. 7A-7C illustrate a scenario for a notebook application that may be implemented on a mobile device 700 having a web browser client 710.

Accessing and launching the application used to share content may be carried out by a touch, mouse click, voice request or other input or gesture. In another case, this application may be launched programmatically. FIG. 7A illustrates an example user interface for launching the application used to share content through a touch input. For example, as shown in FIG. 7A, a user of a mobile device 700 may enter a URL in a web browser client 710 and then select to share the webpage 720 to a note (750).

As shown in FIG. 7B, a preview pane (or pop-up) 760 can open so that a user can view a preview of the content being inserted into the application used to share content. The application used to share content can be a notebook application, a reader application, a productivity application or any suitable application available via the capture service. In addition, the preview pane may include features for a user to control where the content is assigned (e.g., the name of the note, the account associated with the note). A user may select (770) to include the content (780), which is shown in the preview pane 760. An option, such as a button, checkbox, or other input field, can be provided to the user to enable the user to select to include the screenshot.

When the application used to share content is the notebook application, the captured content can be viewed in the note when the notebook application is opened. Once the content 780 is included in the note 790, the user can annotate on the screenshot, such as shown in FIG. 7C.

Figure 8A:
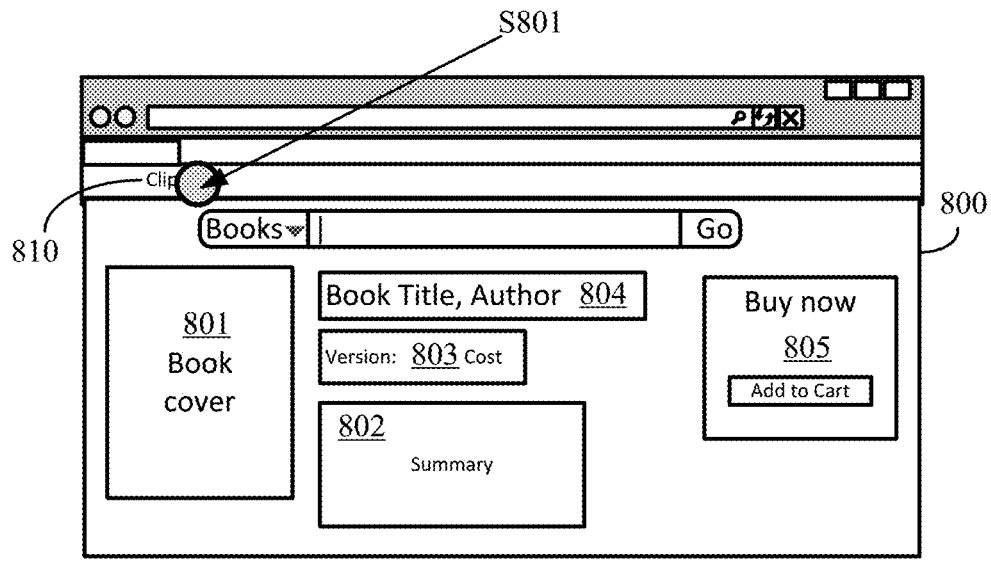
FIGS. 8A-8E illustrate user interfaces for a process flow of an example scenario according to an implementation.

FIGS. 8A-8E illustrate user interfaces for a process flow of an example scenario according to an implementation. In an example scenario, a user, Joy, is browsing an online bookstore and comes across a book she would like to read. Joy can use a clipping tool to clip the book information into her notebook application. For example, as shown in FIG. 8A, Joy may be viewing a webpage 800 for a book on which a book cover 801, summary 802, version(s) and cost 803, and book title and author 804 may be presented. The book may be available for purchase with the transaction available through a purchase link 805. When Joy selects (S801) to clip the page (via clipper 810). The clipping may be of the page, a region of the page and/or a dominant entity of the page.

Figure 8B:
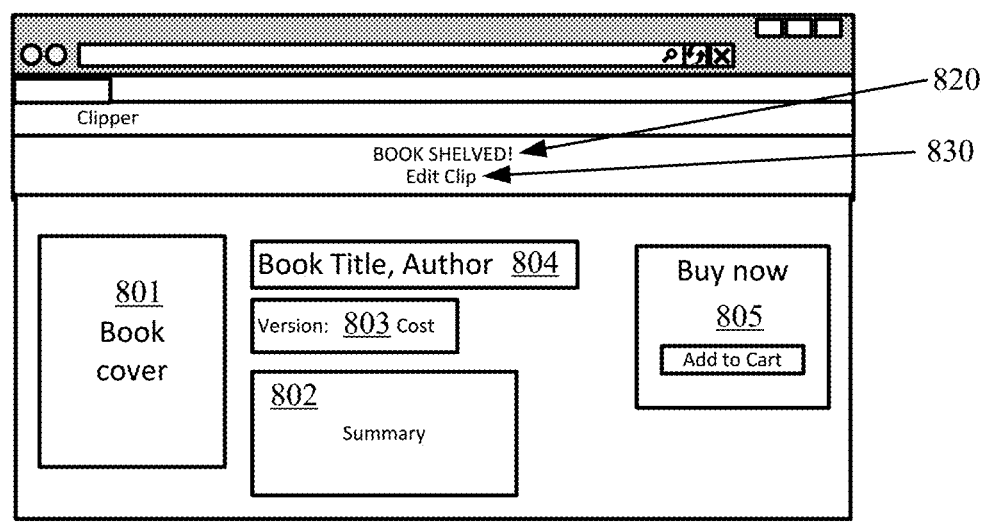
Figure 8C:
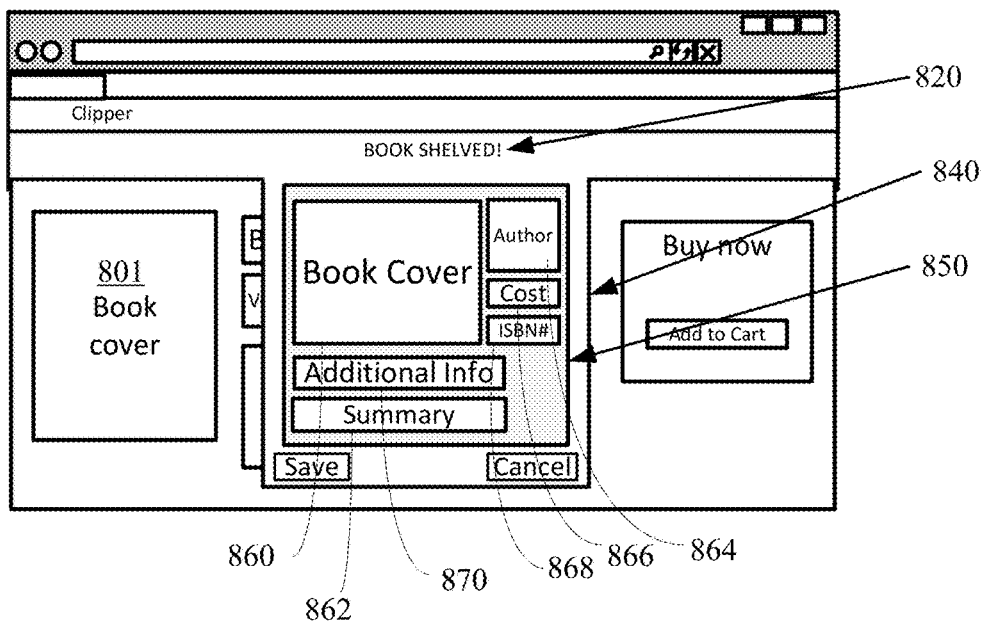
Figure 8D:
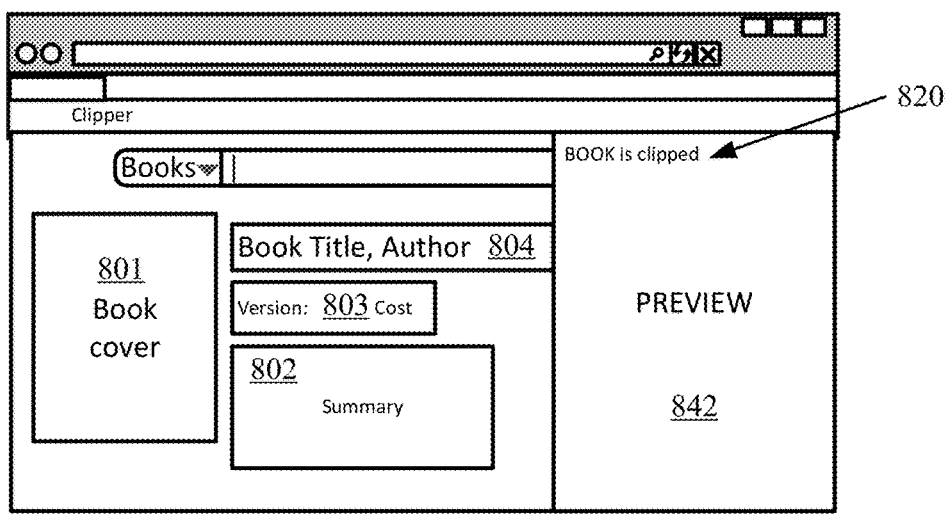
Figure 8E:
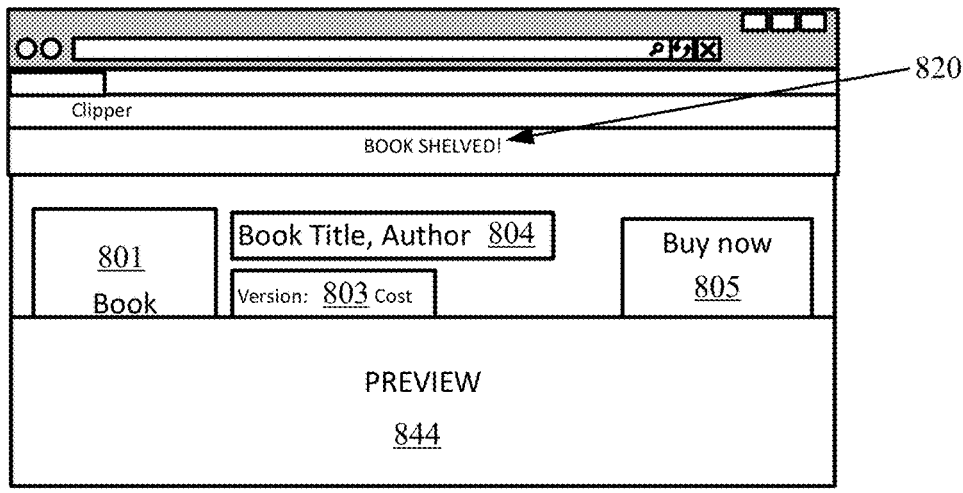

As shown in FIGS. 8B and 8C, in response to clipping the page 800, because the capture service recognizes the dominant entity of the page 800 as being a book, the clipper can display a designated response 820 indicating that the recognized entity is a book. The clipping may be edited from within the clipper, for example, an "edit clip" command 830 may be selected or modifications may be made from within a preview pane (e.g., preview pane 840). The preview pane 840 may or may not be automatically displayed when clipping a page (or portion of the page). FIGS. 8D and 8E illustrate two of many alternate preview pane configurations. FIG. 8D shows a right panel preview pane 842 and FIG. 8E shows a bottom panel preview pane 844.

Returning to FIG. 8C, a book entity container 850 can be displayed in the preview pane 840. The book entity container may provide attributes including, but not limited to, a book cover 860, summary 862, author information 864, cost 866, ISBN 868, and additional information 870. Some of the information for the attributes may be obtained from the webpage content itself. Other information for the attributes may be obtained from one or more external sources.

Figure 9A:
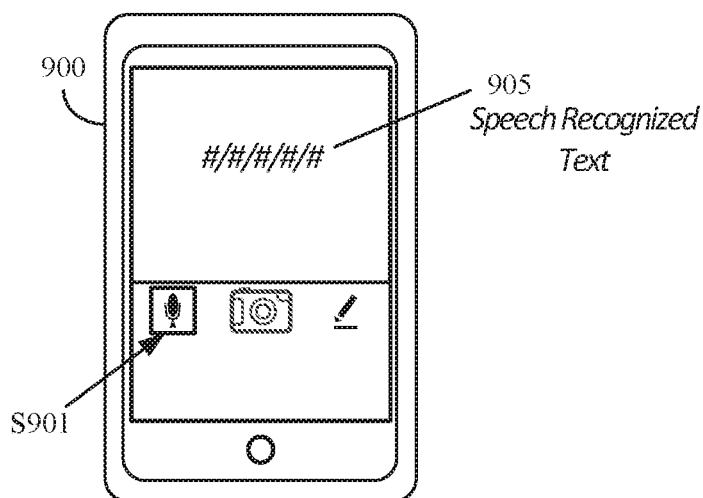
FIGS. 9A-9G illustrate an example scenario according to an implementation.

A user case sequence is illustrated in FIGS. 9A-9G. Referring to FIG. 9A, a user may be talking with a friend who tells her that she must read a certain book. So the user speaks into her cell phone 900 to record (S901) the name in her notebook application as a quick note. In some cases, speech recognized text 905 can be displayed within the note. After receiving this input, the notebook application can (as part of a synching process, in response to a command by the user, as part of some automated process activated by the receipt of content into the notebook application, or other reason) access or call the capture service to request entity recognition.

In this example case, the capture service may indicate that the entity may be a book or a movie and, as a result, the recorded name may have a marker attached indicating that the entity may be the book or the movie (and optionally the corresponding confidence values).

Figure 9B:
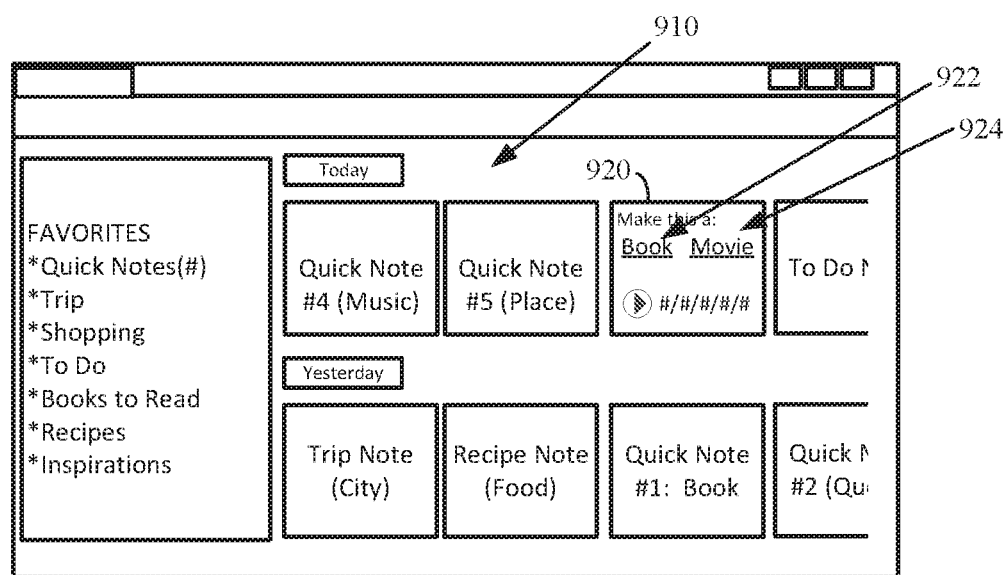

Then, referring to FIG. 9B, when the user opens her notebook application 910, the quick note entry 920 can appear. Because the content of this quick note resulted in two possible entity types, the user can, in this example, select the entity type, book 922 or movie 924, intended for the content.

Figure 9C:
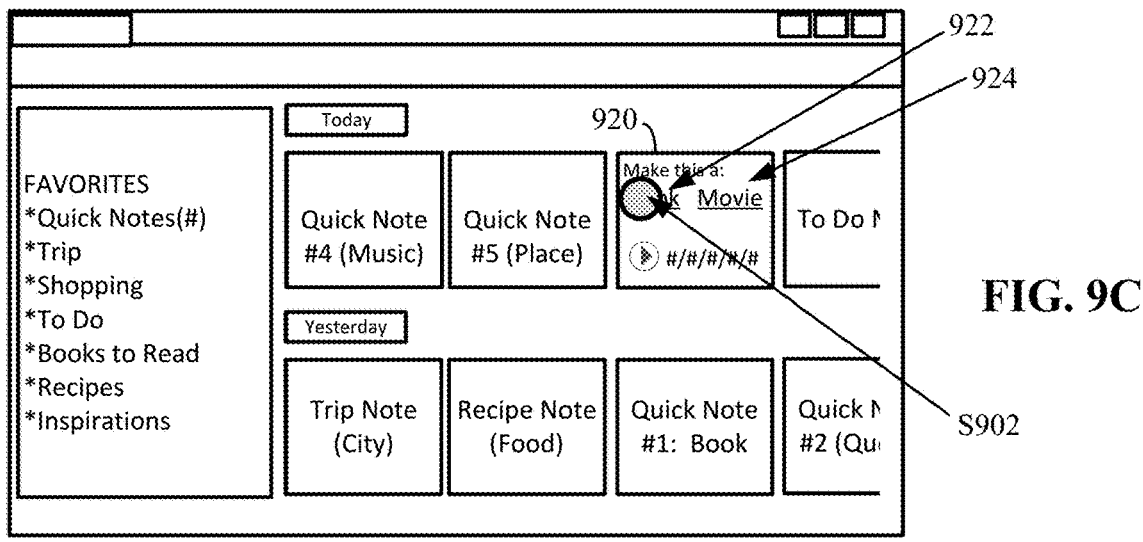
Figure 9D:
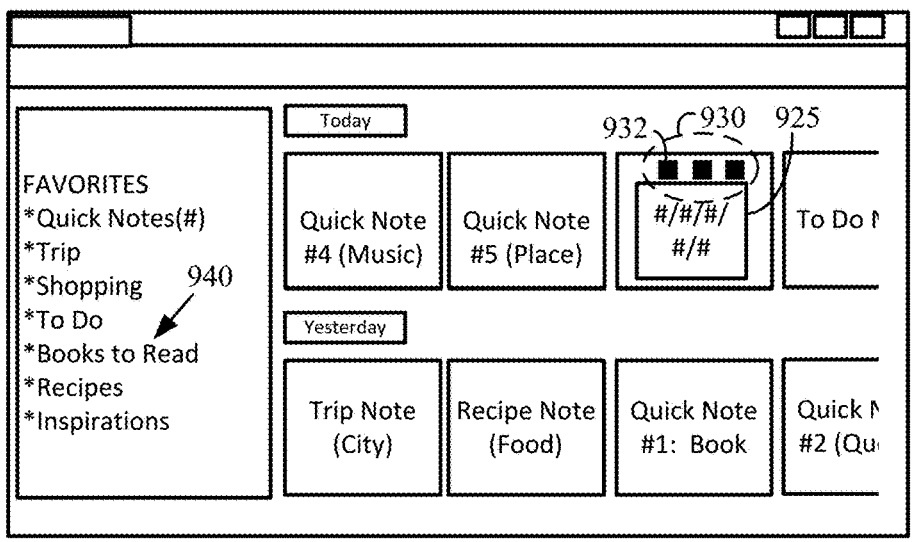

As shown in FIG. 9C, the user selects "book" (S902). This selection can mark the quick note content with the entity marker of "book," which can result in the container "book" being applied to the content. The application of the container can include the notebook application requesting a book container for the named book from the capture service. For this example, as shown in FIG. 9D, when a "book" is recognized in the notebook application, a book cover 925 (received as part of the book container) can be displayed and certain functions 930 may be available to the user, for example, the book can be indicated as being able to be moved 932 to a notebook of books to read 940.

In some implementations, the marking of "book" can also enable another application (which may be a third party application), such as a reader to perform an action on the content in the notebook application. This action can be "to read," for example to determine the books named in the notebook and get the text from another source so that when the user opens the reader, the book can be available for reading. Similarly, a student study guide application may read the books named in the notebook and present a pamphlet style or synopsis for the user.

In one example where a study guide application has permission to access "books" in a note, a user taking notes during class within the notebook application may either have the entity recognition occur automatically or upon the command (for example by selection of text or graphical user interface element of the notebook application) by a user. When a "book" entity is recognized from the note (because of a dominant entity determination that may be carried out at the client or via a capture service the client communicates with), the "book" can be stored. The "book" may be stored separately from the note or as a marker or tag for the note.

Figure 10:
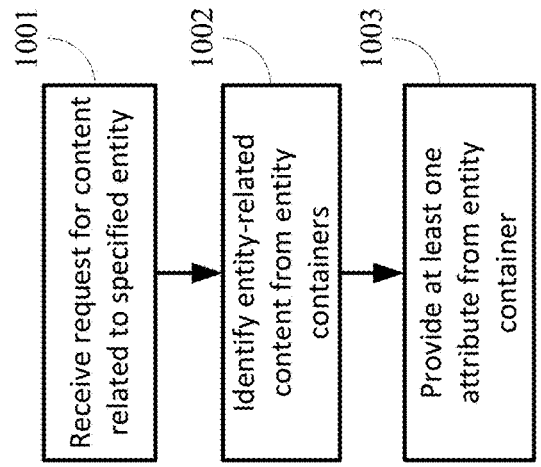
FIG. 10 illustrates a process flow for handling access to content.

In further implementations, the entity container can be obtained and stored as well. FIG. 10 illustrates a process flow for handling access to content. Referring to FIG. 10, the capture service can, in response to receiving a request for content associated with a particular entity (such as "book") (1001), the capture service can identify the entity related container (e.g., the stored "book", entity container and/or marker) (1002). The "book" or elements of the book's entity container (e.g., title) can be communicated or otherwise provided to the source of the request (e.g., study guide application, reader) (1003).

Because the study guide application can access "books," and may also access the storage space to which the note (with book marker) or the "book" (separately) is stored, the study guide application can provide a synopsis to the user for that book. This may occur, for example, while the user is in class and taking notes or at a later time when the user accesses the study guide application.

These extended actions can be possible because of the marking of content with a strongly typed entity.

As one example, a book recommendation application (e.g., a social network related to discussing books) can be linked to a user's notebook application. When a book is rated on the book recommendation application, a book entity for this book can added to a "Books I've read" list in the notebook application so that when books are searched in the notebook, the recommended book can automatically be included in the notebook with relevant information. Conversely, when a book is added to the notebook application, the book may be marked as "Want to read" on the book recommendation application.

Figure 9E:
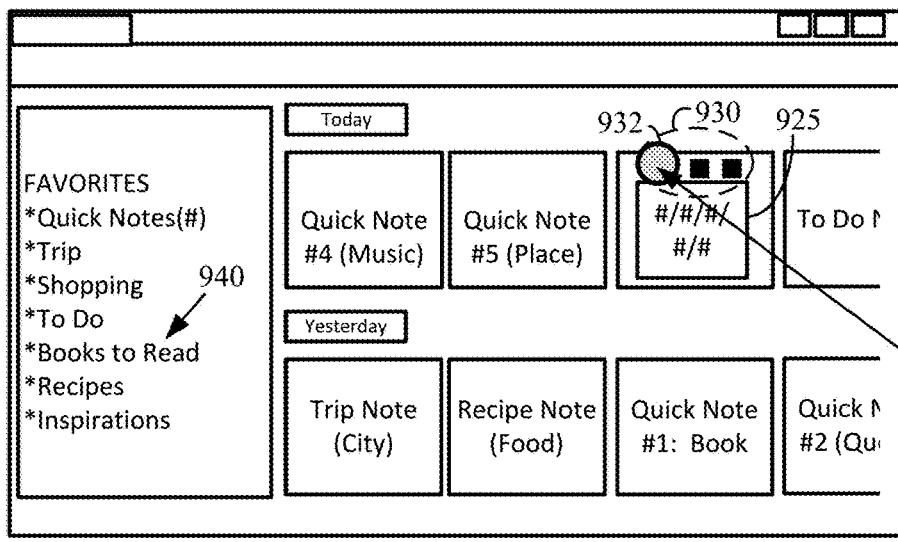
Figure 9F:
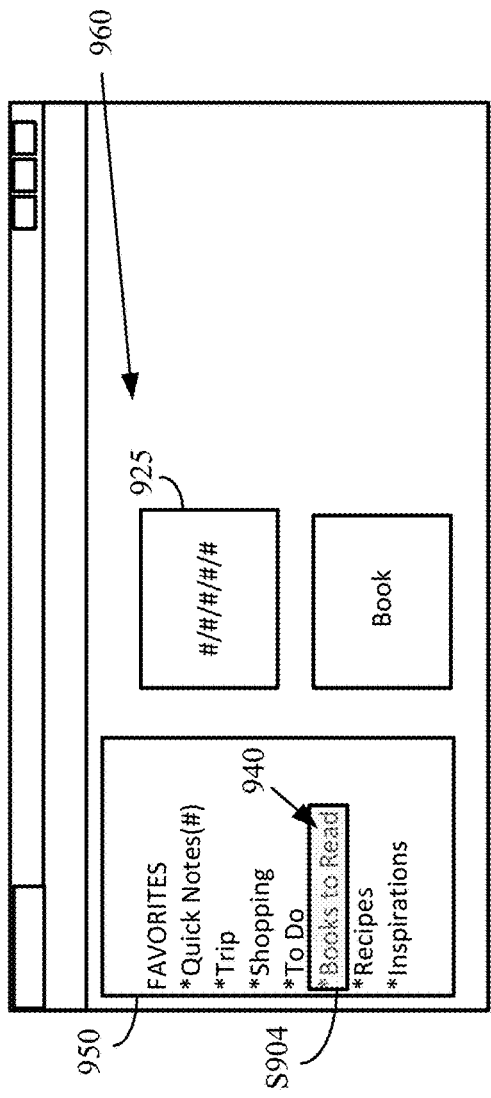
Figure 9G:
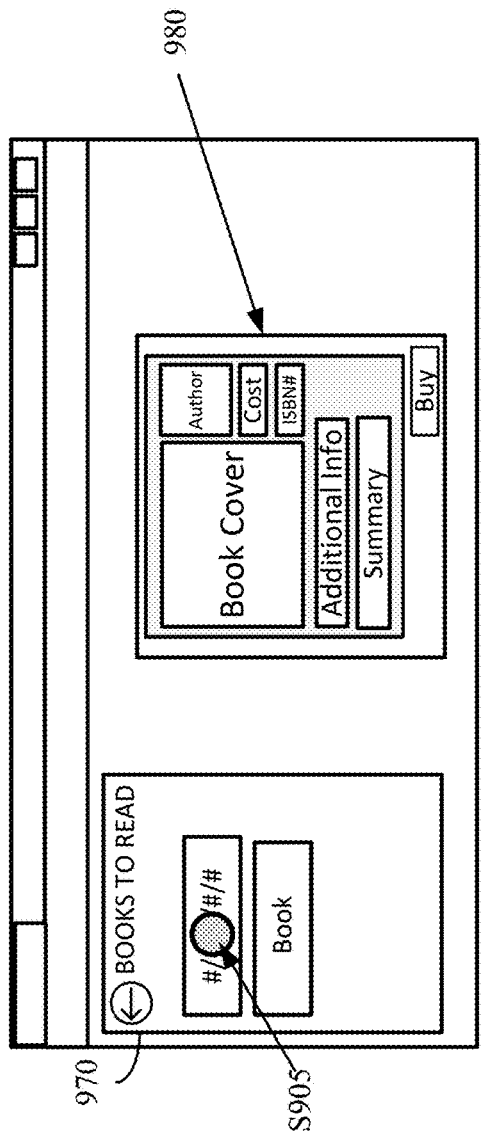

Referring to FIG. 9E, the user may select (S903) the function 932 for moving the item to the books to read 940 file. A "books to read" preview 960 may be available when the "books to read" 940 item on the menu 950 is initially selected (S904) as a filter as shown in FIG. 9F. Then, referring to FIG. 9G, after the user selects (S904) "books to read" 940 from the menu 950, the books to read page is displayed and the user can select the named book from a menu 970. In response to receiving the named book selection (S905), the book container 980 can be displayed. The container 980 can include the genre, the star rating, and a brief description of the book, all displayed without leaving the notebook application. In some implementations, actions may be taken on the item from the note. For example, in some cases, a "buy" button may also be included that can link back to one or more online retailers. In some cases a "read" button or other task related selection may be included so that the user can distinguish between books read and books to be read without having to delete the books from the notebook. The book container 980 can be the same or similar to the book container preview 850 shown in FIG. 8C.

Figure 11:
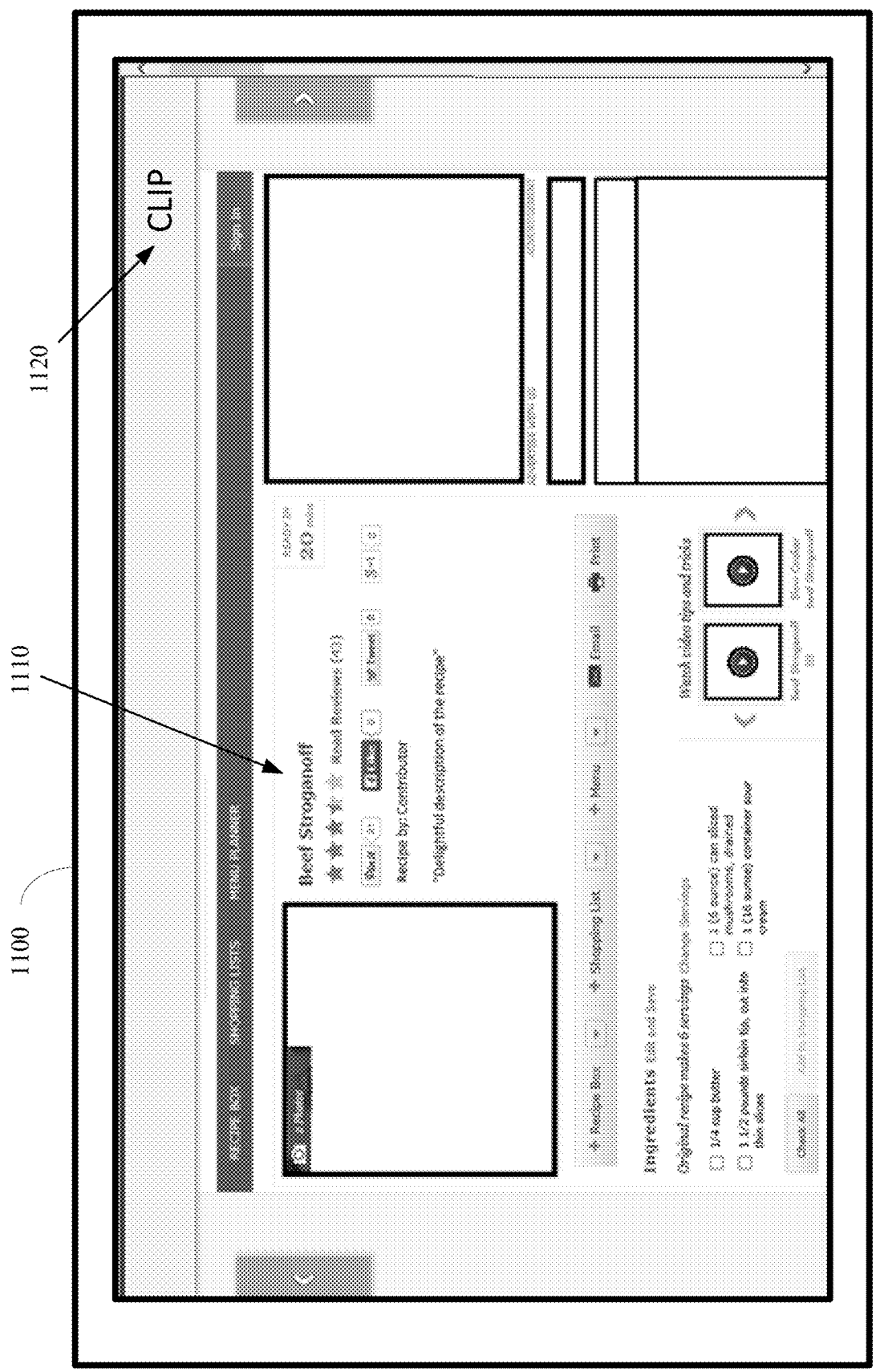
FIG. 11 illustrates a scenario of capturing content associated with a URL.
Figure 12:
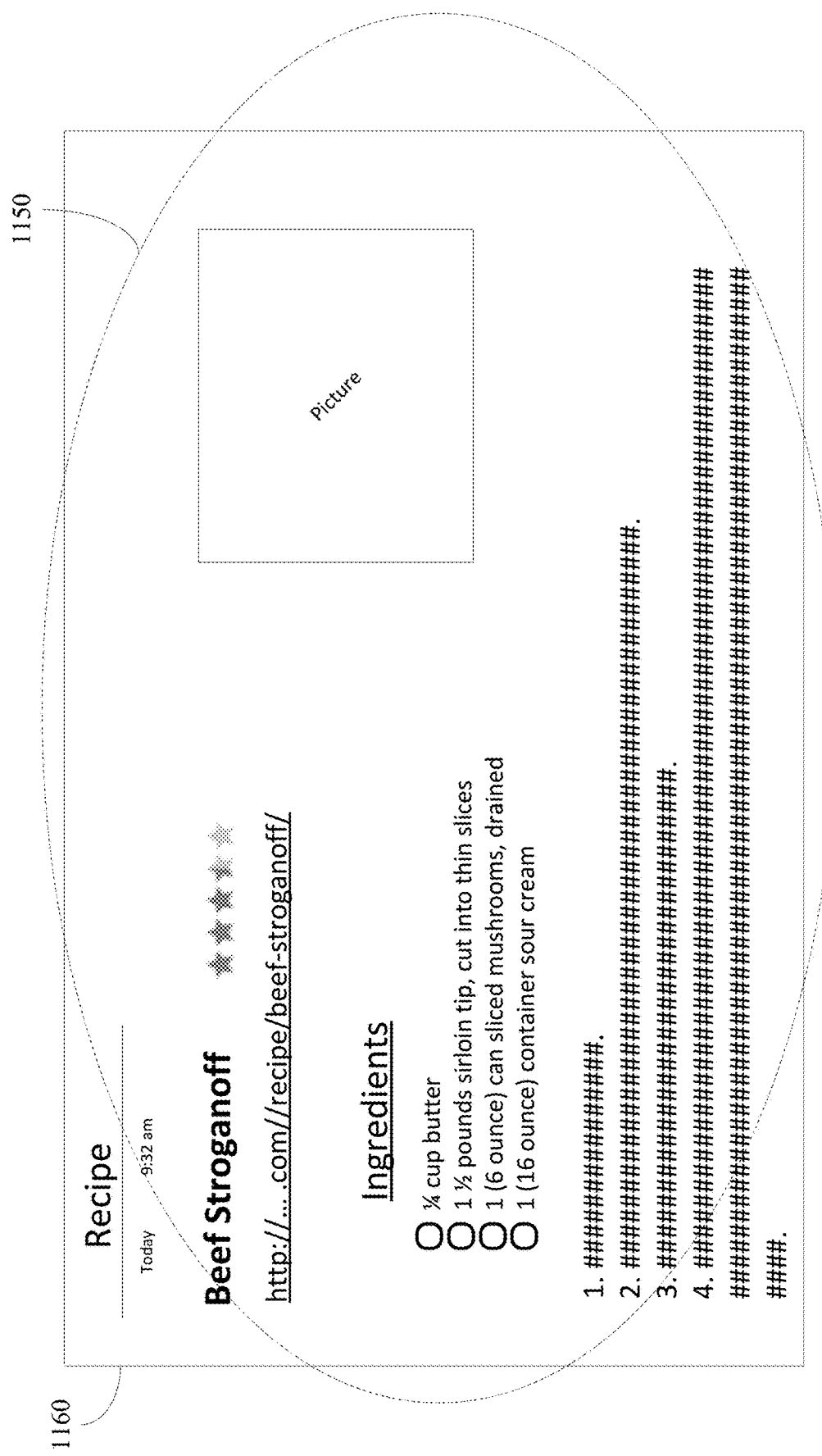
FIG. 12 illustrates an augmented presentation of a captured URL.
Figure 13A:
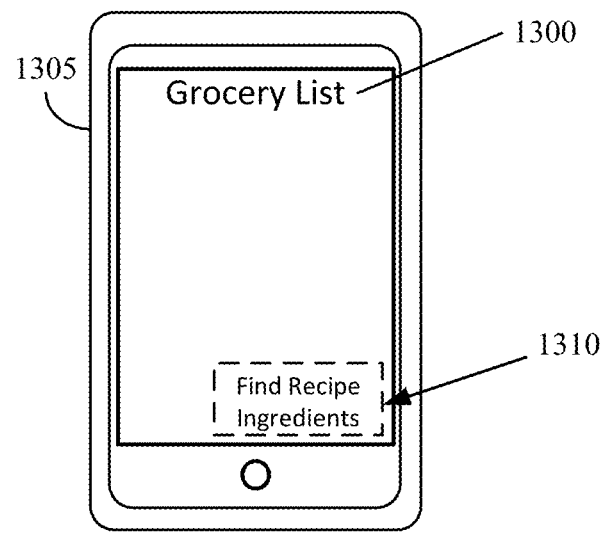
FIGS. 13A and 13B illustrates an external application access of entitized content.
Figure 13B:
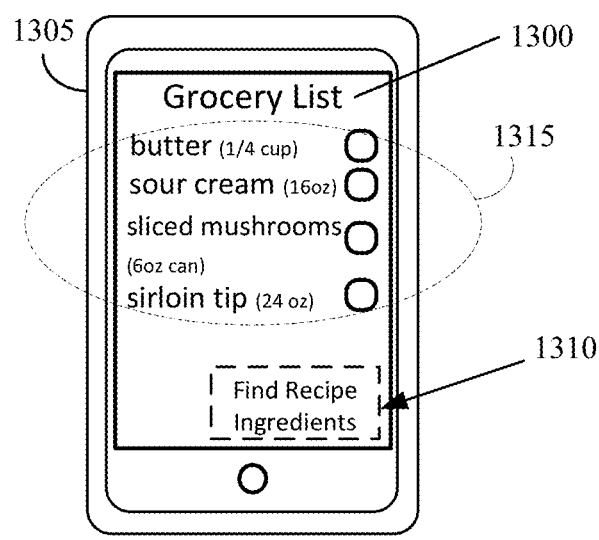

FIG. 11 illustrates a scenario of capturing content associated with a URL; FIG. 12 illustrates an augmented presentation of a captured URL; and FIGS. 13A and 13B illustrates an external application access of entitized content. Referring to FIG. 11, a user may be browsing websites while on their tablet 1100 and see a recipe for "Beef Stroganoff" 1110 that they would like to capture into their notebook application for later use. In one scenario, as illustrated in FIG. 11, they can select to clip 1120 the web page (or a part of the web page) to a note from a clipper. Then, as illustrated in FIG. 12, once the capture service determines that the primary entity is a recipe, a recipe template 1150 can be used to present the entity object created for the recipe in the user's note 1160. The entity object can be searchable (e.g., a query to the notebook application can be made that searches the entity objects), and made accessible to other applications (e.g., applications other than the notebook application). For example, as illustrated in FIG. 13A, a user may be at a grocery store and, using their grocery list application 1300 on their smart phone 1305, can obtain a shopping list based on the recipes they captured into a note.

The grocery list application 1300 may automatically or in response to receiving an indication that the user would like to retrieve recipe ingredients (e.g., via a command to find recipe ingredients such as available through a touch icon 1310) request content from the capture service that relates to "recipes". The capture service can identify "recipes" and communicate at least the ingredients for one or more of the identified recipes.

In some cases, the user may have a particular file or note that contains recipes that the grocery store application can access. In some cases, the grocery store application may access all recipes associated with the user's account. The particular configuration may be based on settings available through the capture service and/or the particular application requesting the content. In some cases, the user may select a particular recipe from a plurality of recipes communicated to the grocery list based on the ingredients and add those ingredients to their grocery list.

Once the grocery list application receives the ingredients, the ingredients 1315 may be added to the list as illustrated in FIG. 13B. The ingredients 1315 may be added to an existing list or a new list may be generated for each recipe.

Recipes can be captured, used, reused and accessed in a variety of ways. Recipes can be collected through web, email and other services, through cookbooks and magazines, and even through handwritten notes. Once collected, content having an entity container can be used not only within the user's notebook application, but also through other applications.

The structure for content recognized as having an entity of a recipe may include ingredients, cuisine, and nutrition. A service element can also be included to facilitate functionality such as video tutorials for recipe techniques (e.g., how to sauté), unit conversion, and grocery list updating. The structured information can be searchable and accessible because of the entity container stored associated with the content. Thus, a search of a user's note does not have to be a word search of the content itself, but can be a request for a specific property of a recipe. For the recipe example, a grocery list app can query for recipes and receive ingredients or an online shopping and/or delivery service (such as provided by Amazon.com) may access the ingredients list of certain recipes and automatically shop for ingredients. Content can be accessible to other applications for facilitating the viewing and/or use of the content. For example, content indicated as being a "recipe" can be accessed by applications providing a "hands-free" cookbook view or meal planning services.

Instead of (or in addition to) capturing the HTML or an image of a web page (or part of the web page), an entity container can be created to store content from the web page in a structured manner (and even include additional features and/or functionality). For example, the recipe collection web site Allrecipes.com includes functionality such as check boxes by ingredients, video tutorials, reviews, reading layouts (for use while cooking) and even a recipe timer widget. Some of this functionality may be transferred to the user's notebook application through the use of service elements and/or enhanced functionality at the notebook application.

Figure 14:
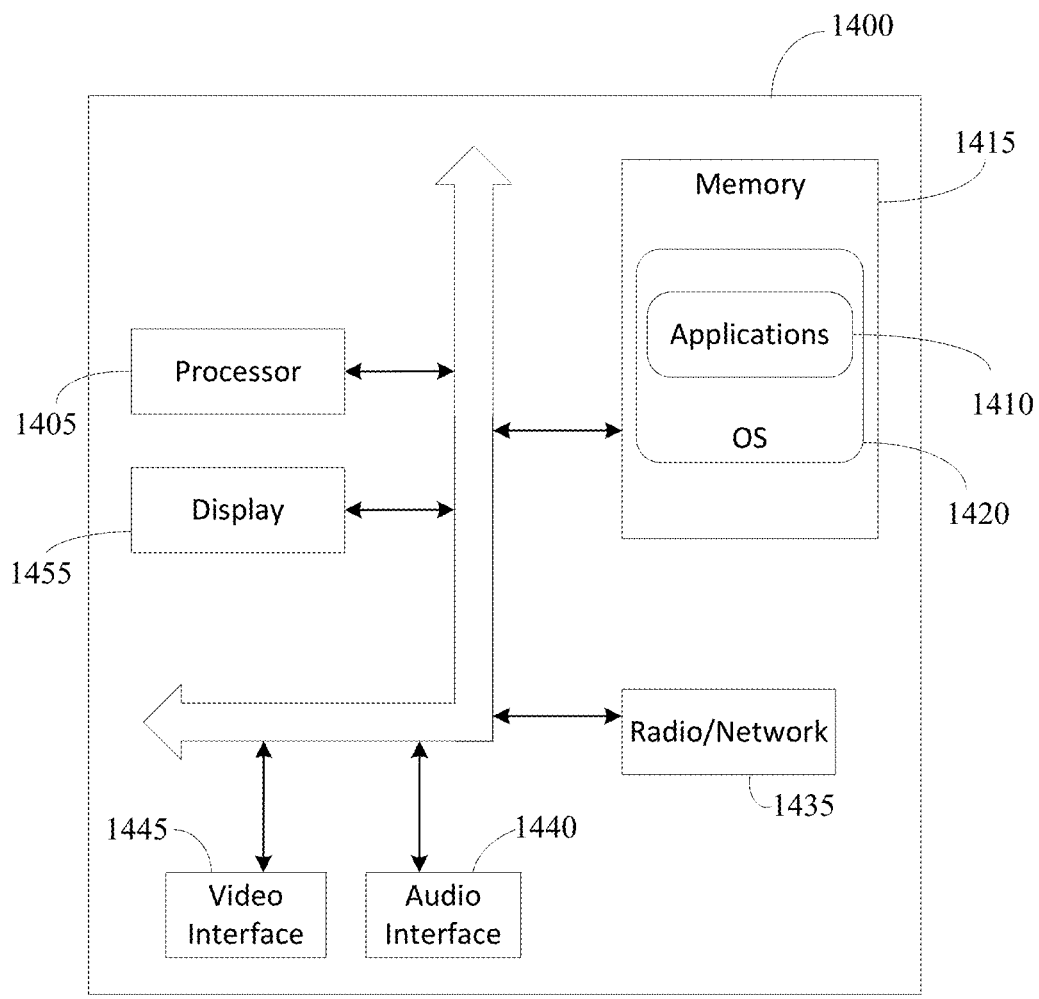
FIG. 14 is a block diagram illustrating components of a computing device used in some embodiments.

FIG. 14 is a block diagram illustrating components of a computing device used in some embodiments. For example, system 1400 can be used in implementing a computing device embodying the client(s) 100, 500, 900, and the like. It should be understood that aspects of the system described herein are applicable to both mobile and traditional desktop computers, as well as server computers and other computer systems. Accordingly certain aspects described with respect to system 1400 are applicable to server(s) on which the capture services (e.g., capture services 115, 505) are carried out.

For example, system 1400 includes a processor 1405 that processes data according to instructions of one or more application programs 1410, and/or operating system (OS) 1420. The processor 1405 may be, or is included in, a system-on-chip (SoC) along with one or more other components such as network connectivity components, sensors, video display components.

The one or more application programs 1410 may be loaded into memory 1415 and run on or in association with the operating system 1420. Examples of application programs include phone dialer programs, e-mail programs, information management programs, word processing programs, Internet browser programs, messaging programs, game programs, notebook applications and the like. Other applications may be loaded into memory 1415 and run on the device, including various client and server applications.

Examples of operating systems include Symbian® OS, Windows® phone OS, Windows®, Blackberry® OS, Apple® iOS®, and Android® OS. Other operating systems are contemplated.

System 1400 may also include a radio/network interface 1435 that performs the function of transmitting and receiving radio frequency communications. The radio/network interface 1435 facilitates wireless connectivity between system 1400 and the "outside world," via a communications carrier or service provider. Transmissions to and from the radio/network interface 1435 are conducted under control of the operating system 1420, which disseminates communications received by the radio/network interface 1435 to application programs 1410 and vice versa.

The radio/network interface 1435 allows system 1400 to communicate with other computing devices, including server computing devices and other client devices, over a network.

In various implementations, data/information stored via the system 1400 may include data caches stored locally on the device or the data may be stored on any number of storage media that may be accessed by the device via the radio/network interface 1435 or via a wired connection between the device and a separate computing device associated with the device, for example, a server computer in a distributed computing network, such as the Internet. As should be appreciated such data/information may be accessed through the device via the radio interface 1435 or a distributed computing network. Similarly, such data/information may be readily transferred between computing devices for storage and use according to well-known data/information transfer and storage means, including electronic mail and collaborative data/information sharing systems.

An audio interface 1440 can be used to provide audible signals to and receive audible signals from the user. For example, the audio interface 1440 can be coupled to a speaker to provide audible output and to a microphone to receive audible input, such as to facilitate a telephone conversation. System 1400 may further include video interface 1445 that enables an operation of an optional camera (not shown) to record still images, video stream, and the like. The video interface may also be used to capture certain images for input to a natural user interface (NUI).

Visual output can be provided via a display 1455. The display 1455 may present graphical user interface ("GUI") elements, text, images, video, notifications, virtual buttons, virtual keyboards, messaging data, Internet content, device status, time, date, calendar data, preferences, map information, location information, and any other information that is capable of being presented in a visual form.

The display 1455 may be a touchscreen display. A touchscreen (which may be associated with or form part of the display) is an input device configured to detect the presence and location of a touch. The touchscreen may be a resistive touchscreen, a capacitive touchscreen, a surface acoustic wave touchscreen, an infrared touchscreen, an optical imaging touchscreen, a dispersive signal touchscreen, an acoustic pulse recognition touchscreen, or may utilize any other touchscreen technology. In some embodiments, the touchscreen is incorporated on top of a display as a transparent layer to enable a user to use one or more touches to interact with objects or other information presented on the display.

In other embodiments, a touch pad may be incorporated on a surface of the computing device that does not include the display. For example, the computing device may have a touchscreen incorporated on top of the display and a touch pad on a surface opposite the display.

Certain techniques set forth herein may be described in the general context of computer-executable instructions, such as program modules, executed by one or more computing devices. Generally, program modules include routines, programs, objects, components, and data structures that perform particular tasks or implement particular abstract data types.

Embodiments may be implemented as a computer process, a computing system, or as an article of manufacture, such as a computer program product or computer-readable medium. Certain methods and processes described herein can be embodied as software, code and/or data, which may be stored on one or more computer-readable media. Certain embodiments of the invention contemplate the use of a machine in the form of a computer system within which a set of instructions, when executed, can cause the system to perform any one or more of the methodologies discussed above. Certain computer program products may be one or more computer-readable storage media readable by a computer system and encoding a computer program of instructions for executing a computer process.

Computer-readable media can be any available computer-readable storage media or communication media that can be accessed by the computer system.

Communication media include the media by which a communication signal containing, for example, computer-readable instructions, data structures, program modules, or other data, is transmitted from one system to another system. The communication media can include guided transmission media, such as cables and wires (e.g., fiber optic, coaxial, and the like), and wireless (unguided transmission) media, such as acoustic, electromagnetic, RF, microwave and infrared, that can propagate energy waves. Although described with respect to communication media, carrier waves and other propagating signals that may contain data usable by a computer system are not considered "computer-readable storage media."

By way of example, and not limitation, computer-readable storage media may include volatile and non-volatile, removable and non-removable media implemented in any method or technology for storage of information such as computer-readable instructions, data structures, program modules or other data. For example, a computer-readable storage medium includes, but is not limited to, volatile memory such as random access memories (RAM, DRAM, SRAM); and non-volatile memory such as flash memory, various read-only-memories (ROM, PROM, EPROM, EEPROM), magnetic and ferromagnetic/ferroelectric memories (MRAM, FeRAM), and magnetic and optical storage devices (hard drives, magnetic tape, CDs, DVDs); or other media now known or later developed that is capable of storing computer-readable information/data for use by a computer system. In no case do "computer-readable storage media" consist of carrier waves or propagating signals.

In addition, the methods and processes described herein can be implemented in hardware modules. For example, the hardware modules can include, but are not limited to, application-specific integrated circuit (ASIC) chips, field programmable gate arrays (FPGAs), and other programmable logic devices now known or later developed. When the hardware modules are activated, the hardware modules perform the methods and processes included within the hardware modules.

Certain aspects of the invention provide the following non-limiting embodiments:

Example 1

A method of facilitating content access and management, comprising: receiving a request for content related to a specified entity from a repository associated with a user account, the repository comprising captured content and one or more entity containers for entities recognized from the captured content; identifying, in the repository, at least one entity container associated with the specified entity; and providing or more attributes of the at least one entity container associated with the specified entity to a source of the request.

Example 2

The method of example 1, wherein access to the repository is based on entity type, the request being served when the specified entity corresponds to an entity type with access permission.

Example 3

The method of examples 1 or 2, wherein the providing of the one or more attributes of the at least one entity container associated with the specified entity does not include providing private content contained with the captured content in the repository.

Example 4

The method of any of examples 1-3, wherein identifying the at least one entity container associated with the specified entity comprises: querying the repository for content having markers containing an indication of the specified entity, the markers comprising a schema for the specified entity, the schema indicating attributes for the at least one entity container.

Example 5

The method of any of examples 1-4, wherein the entity container comprises a service element, the source of the request being a service associated with the service element.

Example 6

The method of example 5, wherein the service is a reader application indicated by the service element.

Example 7

The method of any of examples 1-6, wherein an entire note, in which one of the at least one entity container associated with the specified entity is identified, is also provided to the source of the request.

Example 8

The method of any of examples 1-6, wherein content in a note that is marked as being associated with the specified entity is also provided to the source of the request.

Example 9

The method of any of examples 1-6, wherein only the one or more attributes of the entity container associated with content of a note, in which one of the at least one entity container associated with the specified entity is identified, is provided to the source, the remaining content of the note not being provided to the source of the request.

Example 10

The method of any of examples 1-9, wherein the source of the request is a notebook application.

Example 11

One or more computer readable storage media having instructions stored thereon that, when executed by one or more processors, direct the one or more processors to: identify, in a repository associated with a user account, at least one entity container associated with a specified entity indicated in a request for content; and provide one or more attributes of the at least one entity container associated with the specified entity to the source of the request.

Example 12

The media of example 11, wherein access to the repository is based on entity type, the request being served when the specified entity corresponds to an entity type with access permission.

Example 13

The media of examples 11 or 12, wherein any private content contained with the captured content in the repository are not provided with the one or more attributes of the at least one entity container associated with the specified entity.

Example 14

The media of any of examples 11-13, wherein the instructions to identify the at least one entity container associated with the specified entity direct the one or more processors to: query the repository for content having markers containing an indication of the specified entity, the markers comprising a schema for the specified entity, the schema indicating attributes for the at least one entity container.

Example 15

The media of any of examples 11-14, wherein an entire note, in which one of the at least one entity container associated with the specified entity is identified, is also provided to the source of the request.

Example 16

The media of any of examples 11-14, wherein content in a note that is marked as being associated with the specified entity is also provided to the source of the request.

Example 17

The media of any of examples 11-14, wherein only the one or more attributes of the entity container associated with content of a note, in which one of the at least one entity container associated with the specified entity is identified, is provided to the source, the remaining content of the note not being provided to the source of the request.

Example 18

The media of any of examples 11-17, wherein the entity container comprises a service element, the source of the request being a service associated with the service element.

Example 19

The media of example 18, wherein the service is a reader application indicated by the service element.

Example 20

The media of any of examples 11-19, wherein the source of the request is a notebook application.

Example 21

A system for access and management of entity-augmented content, comprising: a repository associated with a user account, the repository comprising captured content and one or more entity containers for entities recognized from the captured content; one or more processors; one or more computer readable storage media; and instructions stored on at least one of the one or more computer readable storage media that, when executed by at least one of the one or more processors, direct the at least one of the one or more processors to: in response to receiving a request for content related to a specified entity from the repository, identify at least one entity container associated with the specified entity; and provide one or more attributes of the at least one entity container associated with the specified entity to the source of the request.

Example 22

The system of example 21, wherein access to the repository is based on entity type, the request being served when the specified entity corresponds to an entity type with access permission.

Example 23

The system of examples 21 or 22, wherein any private content contained with the captured content in the repository are not provided with the one or more attributes of the at least one entity container associated with the specified entity.

Example 24

The system of any of examples 21-23, wherein the instructions to identify the at least one entity container associated with the specified entity direct the one or more processors to: query the repository for content having markers containing an indication of the specified entity, the markers comprising a schema for the specified entity, the schema indicating attributes for the at least one entity container.

Example 25

The system of any of examples 21-24, wherein an entire note, in which one of the at least one entity container associated with the specified entity is identified, is also provided to the source of the request.

Example 26

The system of any of examples 21-24, wherein content in a note that is marked as being associated with the specified entity is also provided to the source of the request.

Example 27

The system of any of examples 21-24, wherein only the one or more attributes of the entity container associated with content of a note, in which one of the at least one entity container associated with the specified entity is identified, is provided to the source, the remaining content of the note not being provided to the source of the request.

Example 28

The system of any of examples 21-27, wherein the entity container comprises a service element, the source of the request being a service associated with the service element.

Example 29

The system of example 28, wherein the service is a reader application indicated by the service element.

Example 30

The system of any of examples 21-29, wherein the source of the request is a notebook application.

Example scenarios have been presented to provide a greater understanding of certain embodiments of the present invention and of its many advantages. The example scenarios described herein are simply meant to be illustrative of some of the applications and variants for embodiments of the invention. They are, of course, not to be considered in any way limitative of the invention.

It should be understood that the examples and embodiments described herein are for illustrative purposes only and that various modifications or changes in light thereof will be suggested to persons skilled in the art and are to be included within the spirit and purview of this application.

What is claimed is:

1. A method comprising:
   receiving captured content for a notebook application associated with a user account;
   receiving one or more entity containers for entities recognized from the captured content, the one or more entity containers comprising attributes of a corresponding recognized entity, including attributes having additional information relevant to the captured content but that is not immediately available at a time of capture of the captured content, wherein the additional information relevant to the captured content is public content obtained from sources across the Internet and generated by a search engine after recognizing the corresponding recognized entity;
   receiving user generated content for the notebook application associated with the user account;
   separately controlling access to 1) the captured content and the user generated content for the notebook application and 2) the one or more entity containers for entities recognized from the captured content, all being stored in a repository and associated with the user account;
   receiving a request for one or more attributes of a specified entity;
   determining a source of the request has permission to access the specified entity;
   identifying, in the repository, at least one entity container from the one or more entity containers associated with the user account and which is associated with the specified entity; and
   providing the one or more attributes of the at least one entity container associated with the specified entity to the source of the request, the one or more attributes including the additional information relevant to the captured content that was obtained after recognizing the corresponding recognized entity, wherein the providing of the one or more attributes of the at least one entity container associated with the specified entity does not include providing private content contained with the captured content for the user account in the repository, wherein the private content is the user generated content.

2. The method of claim 1, wherein access to the repository is based on entity type, the request being served when the specified entity corresponds to an entity type with access permission.

3. The method of claim 1, wherein identifying the at least one entity container associated with the specified entity comprises:
querying the repository for content having markers containing an indication of the specified entity, the markers comprising a schema for the specified entity, the schema indicating attributes for the at least one entity container.

4. The method of claim 1, wherein the at least one entity container comprises a service element, the source of the request being a service associated with the service element.

5. The method of claim 4, wherein the service is a reader application indicated by the service element.

6. The method of claim 1, wherein an entire note, in which one of the at least one entity container associated with the specified entity is identified, is also provided to the source of the request.

7. The method of claim 1, wherein content in a note that is marked as being associated with the specified entity is also provided to the source of the request.

8. The method of claim 1, wherein the source of the request is the notebook application or a second notebook application.

9. One or more computer readable storage media having instructions stored thereon that, when executed by one or more processors, direct the one or more processors to:
receive captured content for a notebook application associated with a user account;
receive one or more entity containers for entities recognized from the captured content, the one or more entity containers comprising attributes of a corresponding recognized entity, including attributes having additional information relevant to the captured content but that is not immediately available at a time of capture of the captured content, wherein the additional information relevant to the captured content is public content obtained from sources across the Internet and generated by a search engine after recognizing the corresponding recognized entity;
receive user generated content for the notebook application associated with the user account;
separately control access to 1) the captured content and the user generated content for the notebook application and 2) the one or more entity containers for entities recognized from the captured content, all being stored in a repository and associated with the user account;
receive a request for one or more attributes of a specified entity;
determine a source of the request has permission to access the specified entity;
identify, in the repository, at least one entity container from the one or more entity containers associated with the user account and which is associated with a specified entity; and
provide the one or more attributes of the at least one entity container associated with the specified entity to the source of the request, the one or more attributes including the additional information relevant to the captured content that was obtained after recognizing the corresponding recognized entity,
wherein private content contained with the captured content for the user account in the repository is not provided to the source of the request with the one or more attributes of the at least one entity container associated with the specified entity, wherein the private content is the user generated content.

10. The media of claim 9, wherein the instructions to identify the at least one entity container associated with the specified entity direct the one or more processors to:
query the repository for content in a file having markers containing an indication of the specified entity, the markers comprising a schema for the specified entity, the schema indicating attributes for the at least one entity container.

11. The media of claim 9, wherein the at least one entity container comprises a service element, the source of the request being a service associated with the service element.

12. The media of claim 11, wherein the service is a reader application indicated by the service element.

13. The media of claim 9, wherein the source of the request is the notebook application or a second notebook application.

14. A system comprising:
a repository associated with a user account of a notebook application, the repository comprising captured content, user generated content, and one or more entity containers for entities recognized from the captured content, wherein the one or more entity containers comprise attributes having additional information relevant to the captured content but that is not immediately available at a time of capture of the captured content, and wherein the additional information relevant to the captured content is public content obtained from sources across the Internet and generated by a search engine after recognizing the entities from the captured content;
one or more processors;
one or more computer readable storage media; and
instructions stored on at least one of the one or more computer readable storage media that, when executed by at least one of the one or more processors, direct the at least one of the one or more processors to:
separately control access to 1) the captured content and the user generated content for the notebook application and 2) the one or more entity containers for entities recognized from the captured content that are all stored in the repository and associated with the user account; and
in response to receiving a request for one or more attributes related to a specified entity from the repository:
determine a source of the request has permission to access the specified entity;
identify at least one entity container associated with the specified entity from the one or more entity containers in the repository associated with the user account of the notebook application; and
provide the one or more attributes of the at least one entity container associated with the specified entity to the source of the request, the one or more attributes including the additional information relevant to the captured content that was obtained after recognizing the entities from the captured content,
wherein private content contained with the captured content for the user account in the repository is not provided to the source of the request with the one or more attributes of the at least one entity container associated with the specified entity, wherein the private content is the user generated content.

15. The system of claim 14, wherein access to the repository is based on entity type, the request being served when the specified entity corresponds to an entity type with access permission.

16. The system of claim 14, wherein the at least one entity container comprises a service element, the source of the request being a service associated with the service element.

17. The system of claim 16, wherein the service is a reader application indicated by the service element.

18. The system of claim 14, wherein the source of the request is the notebook application or a second notebook application.

19. The method of claim 1, wherein only the additional information relevant to the captured content is provided to the source.

* * * * *